United States Patent
Celozzi et al.

(10) Patent No.: US 10,972,336 B2
(45) Date of Patent: Apr. 6, 2021

(54) TECHNIQUE FOR RESOLVING A LINK FAILURE

(71) Applicant: Telefonaktiebolaget LM Ericsson (publ), Stockholm (SE)

(72) Inventors: Giuseppe Celozzi, Naples (IT); Luca Baldini, Rome (IT); Daniele Gaito, Naples (IT); Gaetano Patria, San Prisco (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/309,191

(22) PCT Filed: Jun. 16, 2016

(86) PCT No.: PCT/EP2016/063926
§ 371 (c)(1),
(2) Date: Dec. 12, 2018

(87) PCT Pub. No.: WO2017/215756
PCT Pub. Date: Dec. 21, 2017

(65) Prior Publication Data
US 2019/0149397 A1    May 16, 2019

(51) Int. Cl.
*H04L 12/24*      (2006.01)
*G06F 9/455*      (2018.01)
*H04L 12/717*     (2013.01)

(52) U.S. Cl.
CPC ...... *H04L 41/0668* (2013.01); *G06F 9/45558* (2013.01); *H04L 41/0672* (2013.01);
(Continued)

(58) Field of Classification Search
CPC ....... G06F 2009/45595; G06F 9/45533; G06F 9/45558; H04L 41/0668; H04L 41/0672;
(Continued)

(56) References Cited

U.S. PATENT DOCUMENTS 6,996,514 B2 *   2/2006  Gruber ............... H04L 41/0681
                                                    370/242
8,644,188 B1 *   2/2014  Brandwine ......... H04L 12/4641
                                                    370/254
(Continued)

FOREIGN PATENT DOCUMENTS

EP     3024174 A1     5/2016
WO     WO-2017157903 A1 *  9/2017 ......... H04L 41/0654

OTHER PUBLICATIONS

International Search Report and Written Opinion of the International Searching Authority, PCT/EP2016/063926, dated Feb. 2, 2017, 16 pages.
(Continued)

*Primary Examiner* — Un C Cho
*Assistant Examiner* — Shah M Rahman
(74) *Attorney, Agent, or Firm* — Sage Patent Group

(57) ABSTRACT

A technique for resolving a link failure occurring on a link between a first virtualized network function, VNF, and a second VNF provided in a cloud computing environment is disclosed. A method implementation of the technique is performed by the first VNF and comprises receiving a link failure notification comprising link recovery status information indicating a current recovery status of the link, and triggering an action depending on the link recovery status information to resolve the link failure.

21 Claims, 23 Drawing Sheets

(52) U.S. Cl.
CPC ...... *H04L 41/0681* (2013.01); *H04L 41/0686* (2013.01); *H04L 45/42* (2013.01); *G06F 9/45533* (2013.01); *G06F 2009/45595* (2013.01)

(58) Field of Classification Search
CPC .. H04L 41/0681; H04L 41/0686; H04L 45/42
See application file for complete search history.

(56) References Cited

U.S. PATENT DOCUMENTS

| | | | | |
|---|---|---|---|---|
| 10,049,023 | B1* | 8/2018 | Bhalerao | H04L 41/5009 |
| 2011/0219271 | A1* | 9/2011 | Kaneko | G06F 11/07 714/47.1 |
| 2012/0017114 | A1* | 1/2012 | Timashev | G06F 11/1469 714/15 |
| 2012/0060165 | A1* | 3/2012 | Clarke | G06F 9/5038 718/104 |
| 2013/0150126 | A1* | 6/2013 | Pattaswamy | H04W 76/34 455/558 |
| 2015/0033081 | A1* | 1/2015 | Bickford | G06F 11/004 714/39 |
| 2016/0077935 | A1* | 3/2016 | Zheng | G06F 11/2028 714/4.12 |
| 2016/0224409 | A1* | 8/2016 | Liu | H04L 67/10 |
| 2016/0277271 | A1* | 9/2016 | Wang | H04L 41/0668 |
| 2016/0315802 | A1* | 10/2016 | Wei | H04L 41/0686 |
| 2018/0013586 | A1* | 1/2018 | Wang | H04L 41/0886 |
| 2018/0026832 | A1* | 1/2018 | Yu | H04L 41/0631 370/216 |
| 2019/0073269 | A1* | 3/2019 | Chou | H04L 41/0654 |

OTHER PUBLICATIONS

ETSI Industry Specification Group (ISG) Network Functions Virtualisation (NFV), Network Functions Virualisation (NFV); Resiliency Requirements, ETSI GS NFV-REL 001 V1.1.1 (Jan. 2015), Reference DGS/NFV-REL001, Jan. 31, 2015, XP014235737, 650 Route des Lucioles F-06921 Sophia Antipolis Cedex, France, 82 pages.

ETSI Industry Specification Group (ISG) Network Functions Virtualisation (NFV)' Infrastructure; Network Domain, ETSI GS NFV-INF 005 V1.1.1 (Dec. 2014),Reference DGS/NFV-INF005, 650 Route des Lucioles F-06921 Sophia Antipolis Cedex, France, 53 pages.

ETSI Industry Specification Group (ISG) Network Functions Virtualisation (NFV) Management and Orchestration, ETSI GS NFV-MAN 001 V1.1.1 (Dec. 2014), Reference DGS/NFV-MAN001 650 Route des Lucioles F-06921 Sophia Antipolis Cedex, France, 184 pages.

ETSI Industry Specification Group (ISG) Network Functions Virtualisation (NFV) Architectural Framework, ETSI GS NFV 002 V1.1.1 (Oct. 2013), Reference DGS/NFV-0010, 650 Route des Lucioles F-06921 Sophia Antipolis Cedex, France, 21 pages.

* cited by examiner

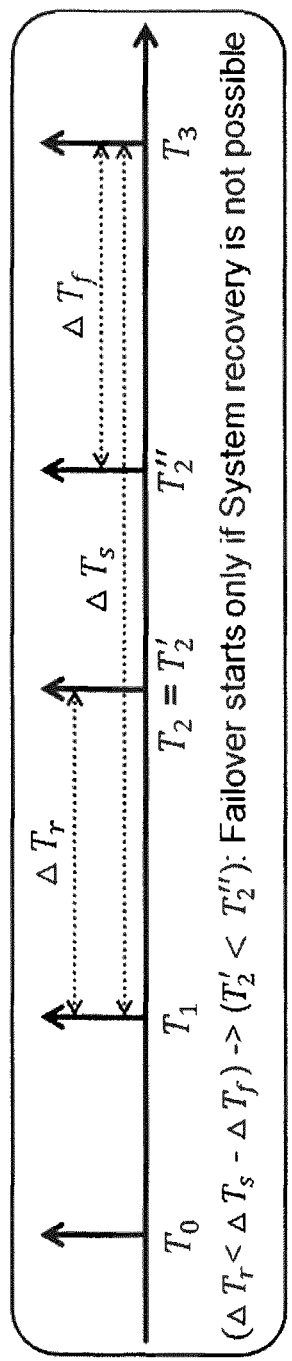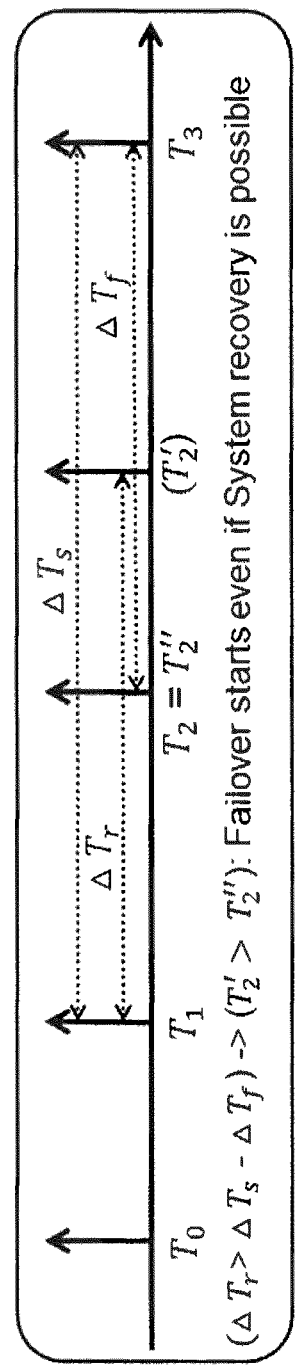

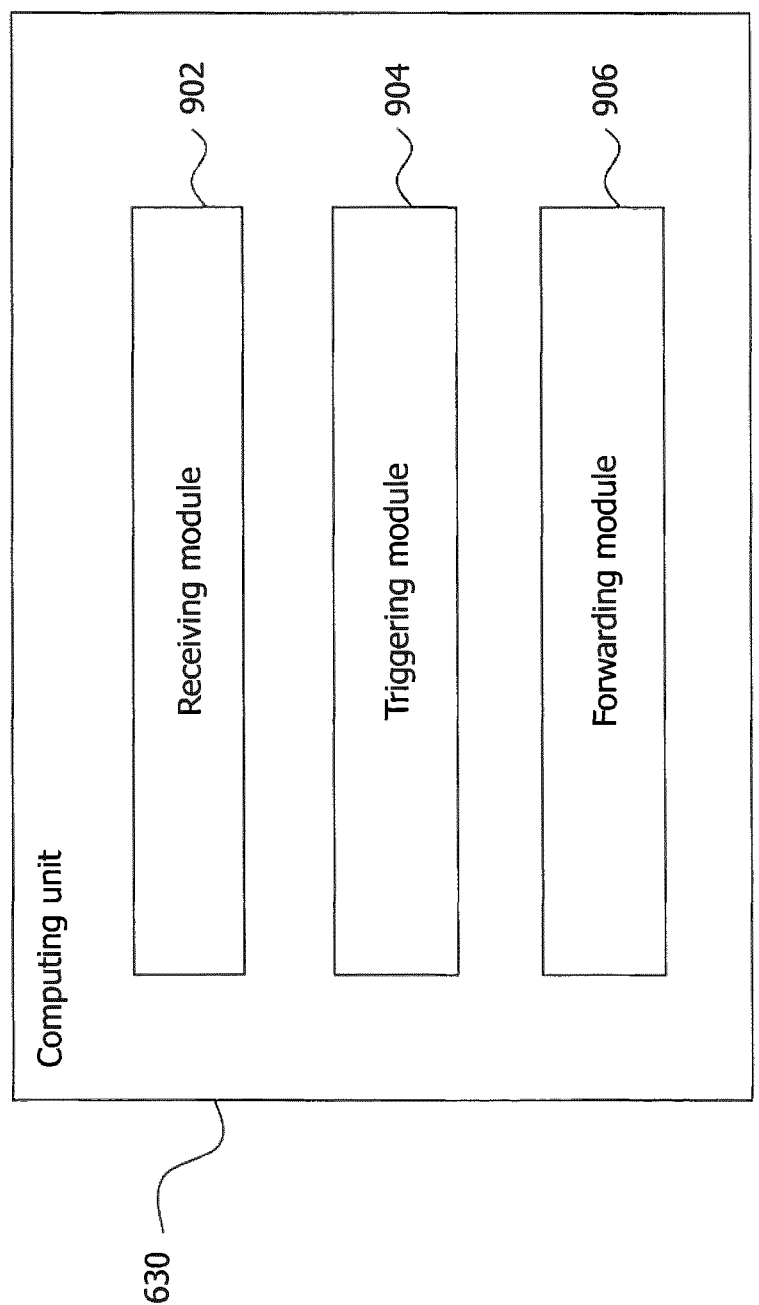

TECHNIQUE FOR RESOLVING A LINK FAILURE

CROSS REFERENCE TO RELATED APPLICATIONS

This application is a 35 U.S.C. § 371 national stage application of PCT International Application No. PCT/EP2016/063926 filed on Jun. 16, 2016, the disclosure and content of which is incorporated by reference herein in its entirety.

TECHNICAL FIELD

The present disclosure generally relates to cloud computing. In particular, a technique for resolving a link failure occurring on a link between a first virtualized network function (VNF) and a second VNF provided in a cloud computing environment is presented. The technique may be embodied in methods, computer programs, apparatuses and systems.

BACKGROUND

In recent years, network functions virtualization (NFV) has evolved as a network architectural concept that uses virtualization technology to virtualize classes of network functions into functional blocks that may connect, or be chained together, to create network services.

In traditional networks, network function (NF) implementations are typically coupled tightly to the physical infrastructure they run on. NFV decouples software implementations of network functions from the computation, storage and network resources they use and virtualization insulates the network functions from these resources through a virtualization layer. The decoupling exposes a new set of entities, the so called virtualized network functions (VNFs). VNFs can be chained with other VNFs and/or physical network functions (PNFs) to realize a network service.

VNFs are software implementations of network functions and can be deployed on a network functions virtualization infrastructure (NFVI). A VNF is generally responsible for handling specific network functions that run on one or more virtual machines (VMs) executed on top of the hardware virtual infrastructure provided by the NFVI. The NFVI encompasses all hardware (e.g., compute, storage and network, including routers and switches) and software (e.g., hypervisors) components that together provide the infrastructure resources on which VNFs are deployed. The NFVI can span several locations, e.g., data centers. A network functions virtualization management and orchestration (NFV-MANO) architectural framework is typically used to manage the NFVI and orchestrate the allocation of resources needed by the network services and VNFs. Typical entities employed in the NFV-MANO framework include a VNF Manager (VNFM) that is responsible for lifecycle management of VNF instances, a virtualized infrastructure manager (VIM) that is responsible for controlling and managing the NFVI resources, and an NFV orchestrator (NFVO) that is responsible for orchestration of NFVI resources across multiple VIMs and a lifecycle management of network services. The NFV architectural framework, the NVF-MANO and further requirements are defined in ETSI GS NFV 002 v1.1.1 (2013-10), ETSI GS NFV-MAN 001 v1.1.1 (2014-12), ETSI GS NFV-INF 005 V1.1.1 (2014-12) and ETSI GS NFV-REL 001 V1.1.1 (2015-01), for example.

Many of today's systems, such as e.g. telecommunication systems, generally require a high degree of availability. The network connections employed in such systems must be designed such that, in case of a network link failure, another link is made available within milliseconds so that no service disturbance is visible to the service user. In an NFVI, a network link between a first VNF and a second VNF may involve various types of different components. In particular, on the first VNF, a guest operating system (OS), a virtual network interface card (vNIC), a virtual switch and a physical network interface card (pNIC) may be involved in establishing the network link. Following the pNIC, one or more physical switches (e.g., top of rack (ToR) switches, end of row (EoR) switches or aggregation switches), virtual routers, gateway routers as well as wide area networks (WANs) may be involved, for example. The same applies to the opposite end of the network link, i.e., to the second VNF, which is the next VNF in the service chain. A link failure between the first VNF and the second VNF can occur due to a fault of any one of these components. Link failures may be detected based on heartbeat messages sent between the first and the second VNF, for example.

For a high degree of availability, today's systems typically support redundancy mechanisms that allow performing failovers from one VNF to another VNF redundantly held available as a backup. For example, if the first VNF detects that the second VNF is not responding (this can basically happen for two reasons: either the network link between the first and the second VNF is down or the second VNF does not respond due to a software malfunction in the second VNF itself), the first VNF may decide to perform a failover to a third VNF which is a backup instance of the second VNF. The link failure may thereby be resolved. On the other hand, the first VNF may decide to wait until the link between the first VNF and the second VNF is recovered (i.e., repaired) by the system, if possible. This may be done, for example, by a managing entity of the NFVI (e.g., a VIM) which allocates a new link, i.e., a different network path, from the first VNF to the second VNF.

The typical operation of existing failover mechanisms is schematically illustrated in FIGS. 1 to 3. In FIG. 1, the first VNF is denoted as VNF-A, the second VNF is denoted as VNF-X and the third (i.e., the backup) VNF is denoted as VNF-Y. The stimulus indicated in FIG. 1 may correspond to a heartbeat message, for example.

In FIGS. 1 to 3, the following abbreviations apply:

$T_0$ denotes the time at which the link failure actually occurs.

$T_1$ denotes the time at which VNF-A detects the link failure.

$T_2$ denotes the time at which VNF-A performs a failover from VNF-X to VNF-Y.

$T_2'$ denotes the time at which recovery of the link is completed by the system (e.g., by a managing entity of the NFVI which allocates a new link, e.g., a different network path, from VNF-A to VNF-X).

$T_2''$ denotes the last possible time to start performing a failover from VNF-X to VNF-Y to remain within $T_3$.

$T_3$ denotes the time at which a maximum allowed link failure time is reached.

$\Delta T_r$ denotes the time needed to recover the link by the system.

$\Delta T_f$ denotes the time needed to complete the failover.

$\Delta T_s$ denotes the maximum allowed link failure time after detection by VNF-A.

Among the above values, the following relationships apply:

$$T_3 = T_1 + \Delta T_s$$

$$T_2' = T_1 + \Delta T_r$$

$$T_2'' = T_3 \Delta T_f$$

$$T_2 = \text{Min}(T_2', T_2'')$$

In traditional PNF systems (that do not use virtualization), $\Delta T_r$ is typically a known fixed value. With VNFs, on the other hand, $\Delta T_r$ is typically neither known nor fixed. $\Delta T_f$ and $\Delta T_s$ are known to VNF-A and can either be fixed or dependent on a current traffic load. The time to perform a failover and to complete recovery at application level can be different depending, for example, on the buffer capacity of the concerned VNFs or the traffic load conditions.

FIG. 1 illustrates the basic operation of existing failover mechanisms. When VNF-A recognizes a link failure in the connection to VNF-X at time $T_1$, VNF-A calculates $\Delta T_f$, $\Delta T_s$, $T_2$ and $T_3$ and starts a failover timer which expires at time $T_2$. If $\Delta T_r$ is not known, it is considered to be "∞". Upon expiry of the failover timer, VNF-A performs a failover from VNF-X to VNF-Y.

As shown in FIG. 2, such failover mechanism generally works well in case $T_2' < T_2''$ because, in this case, the link is already recovered (i.e., repaired) by the system at time $T_2 = T_2'$. Since the failover timer expires at time $T_2$ as well, VNF-A can decide at time $T_2$ that performing a failover from VNF-X to VNF-Y is no longer necessary, thereby avoiding a useless failover.

On the other hand, if $\Delta T_r$ is unknown ("∞") or greater than $\Delta T_s - \Delta T_f$ (i.e., in case $T_2' < T_2'$), existing failover mechanisms start the failover timer at time $T_2 = T_2''$ even if recovery of the link could be completed by the system before $T_3$, as illustrated in the exemplary situation of FIG. 3. In this situation, the failover is performed although it would be more appropriate to skip the failover and wait for the link to be recovered. Another characteristic behavior of existing failover mechanisms occurs in case the network link is not automatically recoverable by the system or the link failure is due to a software malfunction of VNF-X. In these cases, VNF-A waits useless until time $T_2$ before starting to perform the failover from VNF-X to VNF-Y.

In traditional PNF systems, unnecessary failovers are typically avoided by tuning the failover timer values (setting the expiry time $T_2$) that regulate failovers at different network levels. This is not practical in VNF systems, however, where the characteristics of the network infrastructure on which the VNFs are deployed are a priori not known and where the VNFs are decoupled from the characteristics of the underlying hardware infrastructure making any coordinated tuning of failover timers impracticable. Thus, either a complex and error-prone procedure has to be performed at each VNF deployment to configure and tune failover timers considering the current infrastructure, or the provided network service could experience unnecessary failovers seriously decreasing service availability.

SUMMARY

Accordingly, there is a need for a technique for resolving link failures that avoids one or more of the problems discussed above, or other problems.

According to a first aspect, a method for resolving a link failure occurring on a link between a first VNF and a second VNF provided in a cloud computing environment is provided. The method is performed by the first VNF and comprises receiving a link failure notification comprising link recovery status information indicating a current recovery status of the link, and triggering an action depending on the link recovery status information to resolve the link failure.

The link recovery status information may enable the first VNF to determine which action is most appropriate for resolving the link failure, e.g., which action resolves the link failure most quickly and/or with the least effort. The link recovery status information may indicate, for example, that recovery of the link is currently in progress, recovery of the link is already complete or recovery of the link is not possible at all. Recovery of the link may not be possible at all due to a software malfunction of the second VNF which cannot be automatically resolved by a managing entity of the cloud computing environment (e.g., a VIM) and which rather requires manual intervention, e.g., by service personnel in a data center. Recovery of the link may also not be possible when the link is down and an alternative network path from the first VNF to the second VNF cannot be established. Recovery of the link may be indicated to be complete when the link was temporarily down and an alternative network path from the first VNF to the second VNF has already been established, e.g., by a managing entity of the cloud computing environment (e.g., a VIM). Recovery of the link may be indicated to be in progress when the link is currently down and a process for establishing an alternative network path from the first VNF to the second VNF has been initiated, e.g., by a managing entity of the cloud computing environment (e.g., a VIM), but is not yet complete.

In one variant, the link recovery status information may comprise an estimated recovery time that indicates an estimated time within which recovery of the link can be expected. The estimated recovery time may be determined, e.g., by a managing entity of the cloud computing environment (e.g., a VIM or a VNFM), based on past link failure recovery times encountered in the cloud computing environment, as will be described in more detail below. The link recovery status information may also comprise statistical information, such as a medium time to recovery, a variance, or the like.

The action triggered by the first VNF may differ depending on the particular link recovery status information received with the link failure notification. The action may include, for example, waiting for the link to be recovered, performing a failover substituting the second VNF by a third VNF, or simply discarding the link failure notification if no action is required otherwise to resolve the link failure. The third VNF may be a backup instance of the second VNF redundantly held available in the cloud computing environment.

If the link recovery status information indicates that recovery of the link is in progress, the action may comprise waiting for the link to be recovered if the estimated recovery time remains within a maximum allowed link failure time (i.e., $T_3$). On the other hand, if the estimated recovery time does not remain within the maximum allowed link failure time (i.e., $T_3$), the action may comprise triggering performing a failover substituting the second VNF by the third VNF. If the link recovery status information indicates that recovery of the link is not possible, the action may comprise triggering performing a failover substituting the second VNF by the third VNF. If the link recovery status information indicates that recovery of the link is already complete, the action may comprise discarding the link failure notification. In the latter case, no further action may be required to resolve the link failure.

In one variant, the method performed by the first VNF may further comprise detecting the link failure and, if the link failure is detected prior to receiving the link failure notification, starting a failover timer that triggers performing a failover substituting the second VNF by the third VNF at a time (e.g., at $T_2$") that allows completing the failover within a maximum allowed link failure time. If, in this case, the link recovery status information indicates that recovery of the link is either in progress or complete, the action may comprise stopping the failover timer. In this case, the link failure may either be resolved already (recovery of the link complete) or performing the failover may be triggered based on the estimated recovery time (recovery of the link in progress) so that triggering performing the failover by the failover timer may no longer be required.

In a further variant, the method may comprise, prior to receiving the link failure notification, subscribing to receiving link failure notifications. A subscription-based model may thus be used which requires sending a subscription request before link failure notifications can be received. The subscription request may be sent by the first VNF to a managing entity of the cloud computing environment (e.g., a VIM or a VNFM) from which link failure notifications are then transmitted to the first VNF.

The managing entity of the cloud computing environment from which the first VNF receives the link failure notification may, in one variant, be a VNFM which controls the first VNF. The first VNF may then subscribe to receiving link failure notifications at the VNFM. In another variant, the managing entity from which the first VNF receives the link failure notification may be a VIM which controls the NFVI in which the first VNF is deployed. The first VNF may then subscribe to receiving failure notifications at the VIM.

The terms VNF, VNFM, VIM, NFVI, NFVO and NFV may be understood in the sense of ETSI GS NFV 002 v1.1.1 (2013-10), ETSI GS NFV-MAN 001 v1.1.1 (2014-12), ETSI GS NFV-INF 005 V1.1.1 (2014-12) and ETSI GS NFV-REL 001 V1.1.1 (2015-01), or any successor versions thereof. The link to be recovered may be a virtual link (VL) in the sense of these standards. It will be understood, however, that the present disclosure shall not be limited to these standards and that the technique presented herein may be practiced in other frameworks that have a comparable structure.

According to a second aspect, a method for supporting resolution of a link failure occurring on a link between a first VNF and a second VNF provided in a cloud computing environment is provided. The method is performed by a managing entity provided in the cloud computing environment and comprises receiving a link failure notification comprising link recovery status information indicating a current recovery status of the link, and forwarding the link failure notification to a receiving entity provided in the cloud computing environment.

The method according to the second aspect defines a method from a managing entity's perspective (e.g., a VNFM) which may be complementary to the method according to the first aspect (e.g., performed by the first VNF). As such, those aspects described with regard to the method of the first aspect which are applicable to the method of the second aspect may be comprised by the method of the second aspect as well, and vice versa. Unnecessary repetitions are thus omitted in the following.

The managing entity may receive the link failure notification from another managing entity provided in the cloud computing environment (i.e., the link failure notification may not be generated by the managing entity of the second aspect itself). Since the managing entity receives the link failure notification and forwards it to the first VNF, the managing entity may be said to be an intermediary entity in the transmission of the link failure notification to the first VNF.

As in the method of the first aspect, the link recovery status information may comprise an estimated recovery time that indicates an estimated time within which recovery of the link can be expected.

In one variant, the managing entity may be a VNFM which controls the first VNF and the receiving entity may be the first VNF. In another variant, the managing entity may be a VIM which controls the NFVI in which the first VNF is deployed and the receiving entity may be a VNFM which controls the first VNF. In yet another variant, the managing entity may be an NFVO and the receiving entity may be a VNFM which controls the first VNF.

If the receiving entity is the first VNF and a subscription-based model is used, the receiving entity may be subscribed to receiving link failure notifications from the managing entity. For example, the receiving entity may have sent, prior to receiving link failure notifications, a subscription request to the managing entity in order to get registered at the managing entity for receipt of link failure notifications.

According to a third aspect, a method for supporting resolution of a link failure occurring on a link between a first VNF and a second VNF provided in a cloud computing environment is provided. The method is performed by a managing entity provided in the cloud computing environment and comprises receiving a notification that the link failure occurred, triggering generation of a link failure notification comprising link recovery status information indicating a current recovery status of the link, and forwarding the link failure notification to a receiving entity provided in the cloud computing environment.

The method according to the third aspect defines a method from a managing entity's perspective (e.g., a VIM) which may be complementary to either the method according to the first aspect or the method according to the second aspect. As such, those aspects described with regard to the methods of the first and second aspects which are applicable to the method of the third aspect may be comprised by the method of the third aspect as well, and vice versa. Unnecessary repetitions are omitted in the following.

The notification that the link failure occurred may indicate the type of failure that occurred and, optionally, the component involved in establishing the link at which the failure occurred (e.g., vNIC, pNIC, virtual/physical switch, virtual/physical routers, etc.). The link recovery status information included in the link failure notification may be generated based on the information indicated by the notification that the link failure occurred.

As in the methods of the first and second aspects, the link recovery status information may comprise an estimated recovery time that indicates an estimated time within which recovery of the link can be expected. In one implementation, the estimated recovery time may be determined based on past link failure recovery times encountered in the cloud computing environment. For example, the estimated recovery time may be calculated as an average of previously encountered recovery times (i.e., $\Delta T_r$) or may be defined as a maximum of previously encountered recovery times. In another example, the estimated recovery time may be calculated as a weighted average of previously encountered recovery times, wherein the weight may be a probability of occurrence of a particular link failure, e.g., the probability of occurrence of a link failure on a particular network connection point or segment. The previously encountered recovery times may comprise recovery times of all past link failures (i.e., independent of the link failure types) or may comprise recovery times of past link failures of one or more particular link failure types only. Link failure recovery times may be categorized according to link failure types for this purpose. In another implementation, the estimated recovery time may just be a predefined value. It will be understood that, in addition to the estimated recovery time, the link recovery status information may further comprise statistical information, such as a medium time to recovery, a variance, or the like.

In one variant of the method, triggering generation of the link failure notification and forwarding the link failure notification may be repeated upon each receipt of a notification on a change in the current recovery status of the link. In another variant, generation of the link failure notification and forwarding the link failure notification, or forwarding the link failure notification only, may be performed periodically, e.g., repeated in predetermined time intervals.

In one implementation, the managing entity according to the third aspect may be a VNFM which controls at least one of the first VNF and the second VNF. The notification that the link failure occurred and/or the notification on a change in the current recovery status of the link may in this case be received from at least one of the first VNF and the second VNF. The notifications may be events sent from the first VNF and/or the second VNF, respectively.

In one variant of this implementation, both the first VNF and the second VNF may reside in the same data center and may be among a plurality of VNFs under control of the VNFM in the same data center. The receiving entity may in this case be the first VNF. In another variant of this implementation, the first VNF and the second VNF may reside in different data centers. The first VNF may in this case be under control of a first VNFM and the second VNF may be under control of a second VNFM. The managing entity according to the third aspect may then be the second VNFM and the notification that the link failure occurred and/or the notification on a change in the current recovery status of the link may be received from the second VNF. The receiving entity may in this case be an NFVO responsible for orchestration. Thus, the generated link failure notification may be forwarded from the second VNFM to the NFVO, which may in turn forward the link failure notification to the first VNFM that eventually forwards it to the first VNF. Both the NFVO and the first VNFM may thus act as intermediary entities in the sense of the second aspect.

In another implementation, the managing entity according to the third aspect may be a VIM which controls an NFVI in which at least one of the first and the second VNF are deployed, wherein the notification that the link failure occurred and/or the notification on a change in the current recovery status of the link is received from the NFVI. In this case, the receiving entity may be a VNFM which controls the first VNF or, alternatively, the first VNF itself. The notifications may in this case be events sent from a VM executed on the physical hardware resources of the NFVI, wherein the VM may be a VM on which the first or the second VNF is executed.

If the link between the first VNF and the second VNF is recoverable, a VIM may allocate a new link (e.g., a different network path) between the first VNF and the second VNF to recover the link. In one possible implementation, the VIM may select the new link under the constraint to satisfy a link selection parameter that defines a maximum allowed link failure time. The link selection parameter may be defined, for example, by a user who instantiates the first and the second VNF to make sure that link recovery remains within a guaranteed recovery time such that link failures between the first VNF and the second VNF are invisible to service users. The link selection parameter may be configurable at deployment time of the first VNF and the second VNF, e.g., the link selection parameter may be defined in a virtual link descriptor (VLD) when a VL between the first VNF and the second VNF instances is defined in a Network Service Instantiation Flow.

The VIM which allocates the new link between the first VNF and the second VNF may be the VIM which controls the NFVI in which at least one of the first and the second VNF are deployed and which forwards the link failure notification to the VNFM which controls the first VNF. The VIM may send in this case a notification to the VNFM informing the VNFM of the last possible time to start performing a failover from the second VNF to a third VNF to remain within the maximum allowed link failure time. The notification may be sent close to reaching time $T_2$" or at time $T_2$", for example. The VNFM may forward this notification to the first VNF.

According to a fourth aspect, a computer program product is provided. The computer program product comprises program code portions for performing the method of at least one of the first, the second and the third aspect when the computer program product is executed on one or more computing devices (e.g., a processor or a distributed set of processors). The computer program product may be stored on a computer readable recording medium, such as a semiconductor memory, DVD, CD-ROM, and so on.

According to a fifth aspect, a computing unit for resolving a link failure occurring on a link between a first VNF and a second VNF provided in a cloud computing environment is provided, wherein the first VNF is executed on the computing unit. The computing unit comprises at least one processor and at least one memory, the at least one memory containing instructions executable by the at least one processor such that the first VNF is operable to receive a link failure notification comprising link recovery status information indicating a current recovery status of the link, and trigger an action depending on the link recovery status information to resolve the link failure.

According to a sixth aspect, a computing unit for supporting resolution of a link failure occurring on a link between a first VNF and a second VNF provided in a cloud computing environment is provided, wherein a managing entity is executed on the computing unit. The computing unit comprises at least one processor and at least one memory, the at least one memory containing instructions executable by the at least one processor such that the managing entity is operable to receive a link failure notification comprising link recovery status information indicating a current recovery status of the link, and forward the link failure notification to a receiving entity provided in the cloud computing environment.

According to a seventh aspect, a computing unit for supporting resolution of a link failure occurring on a link between a first VNF and a second VNF provided in a cloud computing environment is provided, wherein a managing entity is executed on the computing unit. The computing unit comprises at least one processor and at least one memory, the at least one memory containing instructions executable by the at least one processor such that the managing entity is operable to receive a notification that the link failure occurred, trigger generation of a link failure notification comprising link recovery status information indicating a current recovery status of the link, and forward the link failure notification to a receiving entity provided in the cloud computing environment.

The computing units according to the fifth, the sixth and the seventh aspect may be configured to perform any of the corresponding methods and method steps presented herein.

According to an eighth aspect, there is provided a system comprising a computing unit of the fifth aspect and at least one of a computing unit of the sixth aspect and a computing unit of the seventh aspect.

BRIEF DESCRIPTION OF THE DRAWINGS

Embodiments of the technique presented herein are described herein below with reference to the accompanying drawings, in which:

FIG. 2 illustrates the basic operation of prior art failover mechanisms in a timeline for the case $T_2'<T_2''$;

FIG. 3 illustrates the basic operation of prior art failover mechanisms in a timeline for the case $T_2'>T_2'$;

FIGS. 9a and 9b illustrate a modular composition of a computing unit on which a managing entity that triggers generation of the link failure notification is executed and a corresponding method embodiment which may be performed by the managing entity;

DETAILED DESCRIPTION

In the following description, for purposes of explanation and not limitation, specific details are set forth in order to provide a thorough understanding of the present disclosure. It will be apparent to one skilled in the art that the present disclosure may be practiced in other embodiments that depart from these specific details. For example, while the following embodiments will be described with regard to ETSI GS NFV 002 v1.1.1 (2013-10), ETSI GS NFV-MAN 001 v1.1.1 (2014-12), ETSI GS NFV-INF 005 V1.1.1 (2014-12) and ETSI GS NFV-REL 001 V1.1.1 (2015-01), it will be understood that the present disclosure shall not be limited to these standards and that the technique presented herein may be practiced with any successor versions thereof or in other frameworks having a comparable structure.

Those skilled in the art will further appreciate that the steps, services and functions explained herein below may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories are encoded with one or more programs that perform the steps, services and functions disclosed herein when executed by the one or more processors.

Figure 1:
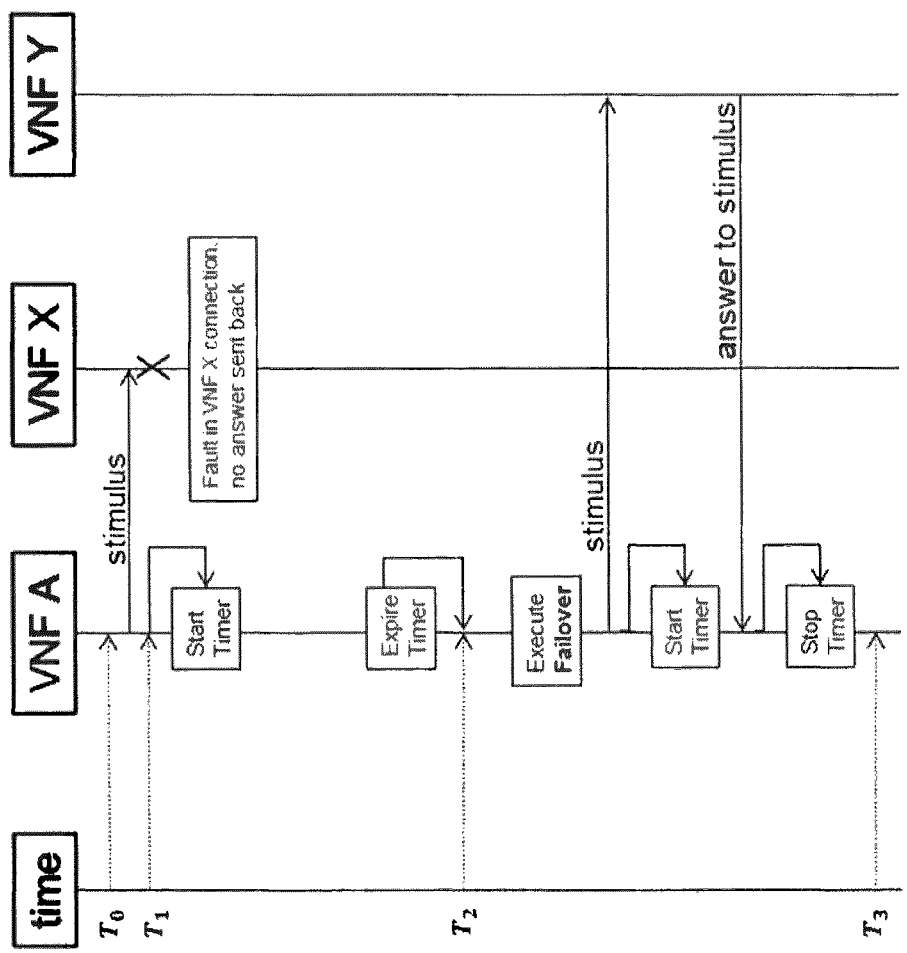
FIG. 1 illustrates the basic operation of prior art failover mechanisms in a sequence diagram.
Figure 4:
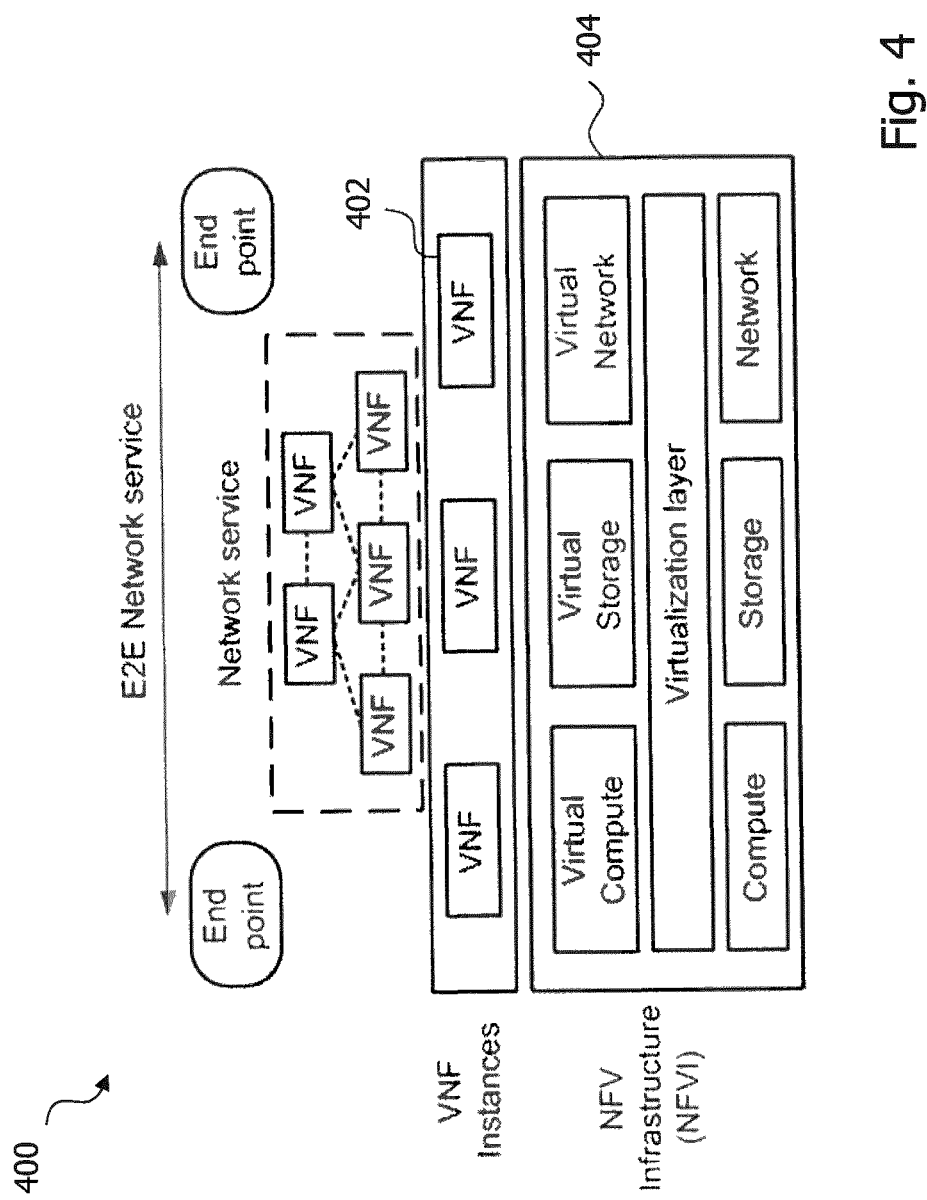
FIG. 4 schematically illustrates an exemplary cloud computing environment which implements an NFV architectural framework in which VNFs are deployed.

FIG. 4 schematically illustrates an exemplary a cloud computing environment 400 which implements an NFV architectural framework in accordance with ETSI GS NFV 002 v1.1.1 (2013-10) in which VNFs 402 are deployed to create a network service between two endpoints. The network service is indicated as a forwarding graph with dashed lines. The network service may comprise a plurality of VNFs 402 which may be chained together in a service chain in accordance with the forwarding graph. The VNFs 402 are software implementations of network functions and are deployed on an NFVI 404. The NFVI 404 encompasses all hardware (e.g., compute, storage and network, including routers and switches) components that together provide the hardware infrastructure resources of the cloud computing environment 400. The NFVI 404 includes a virtualization layer that provides virtual computation, storage and network resources, e.g., through the provision of VMs, on which the VNFs 402 are executed, thereby decoupling execution of the VNFs from the physical computation, storage and network resources of the NFVI 404.

Figure 5:
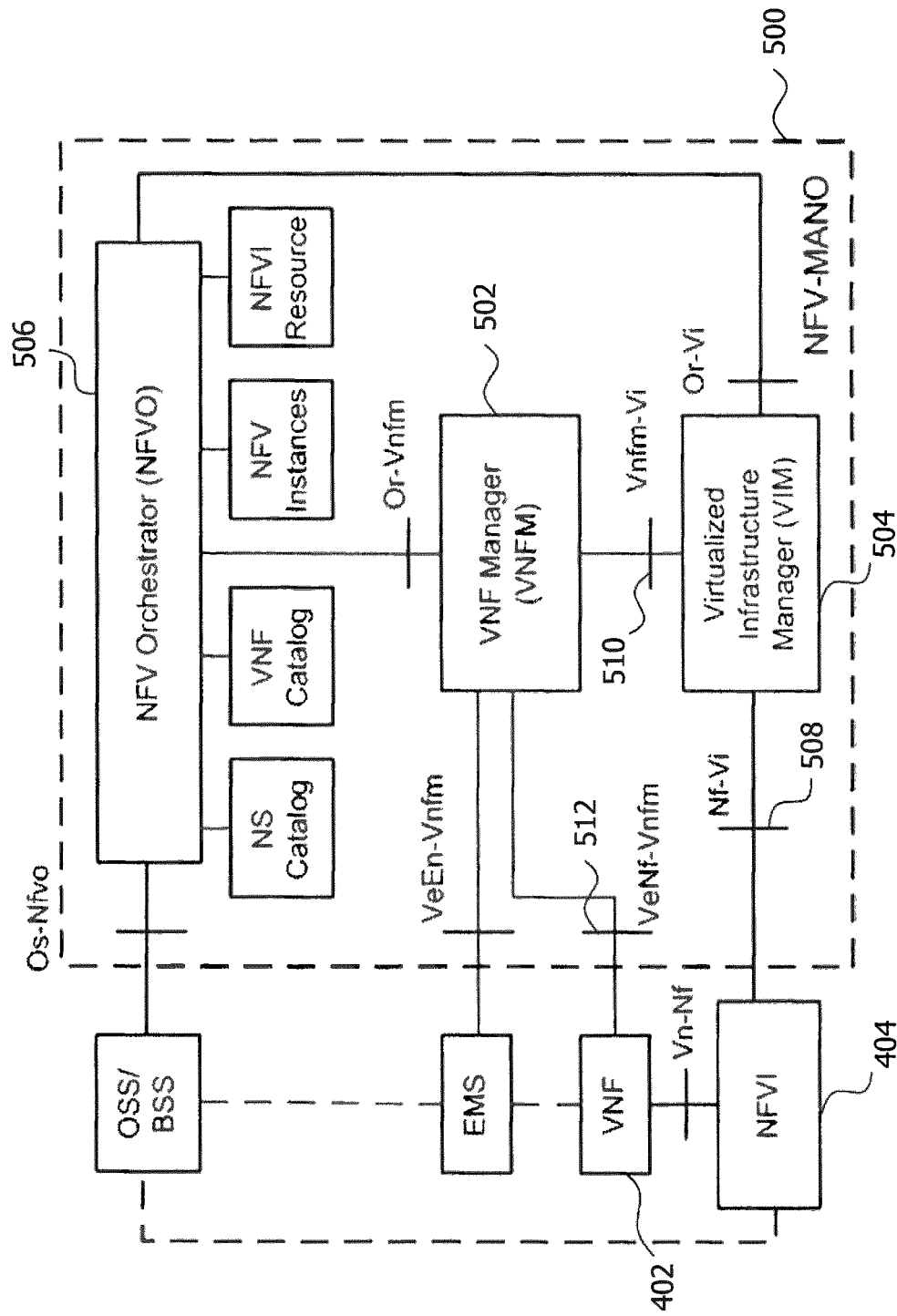
FIG. 5 schematically illustrates an architecture of an NFV-MANO framework.

FIG. 5 schematically illustrates an architecture of a corresponding NFV-MANO framework 500 in accordance with ETSI GS NFV-MAN 001 v1.1.1 (2014-12) and thus provides a framework in which the technique presented herein may be performed. The NFV-MANO framework 500 is used to manage the NFVI 404 and orchestrate the allocation of resources needed by the network services and VNFs 402.

The NFV-MANO framework 500 may comprise one or more VNFMs 502 that are responsible for lifecycle management of VNF instances (e.g., VNF instantiation, VNF termination, etc.), one or more VIMs 504 that are responsible for controlling and managing NFVI resources (e.g., VM allocation, VM termination, network link creation between VMs etc.), and an NFVO 506 that is responsible for orchestration of NFVI resources across multiple VIMs 504 and lifecycle management of network services, for example. In the example illustrated in FIG. 5, only a single VNFM 502 and a single VIM 504 are depicted. Communication between the VIM 504 and the NFVI 404 is carried out using the interface Nf-Vi 508, communication between the VIM 504 and the VNFM 502 is carried out using the interface Vnfm-Vi 510, and communication between the VNFM 502 and the VNFs 402 is carried out using the interface VeNf-Vnfm 512. In the NFV-MANO framework, these interfaces are also called reference points.

Figure 6A:
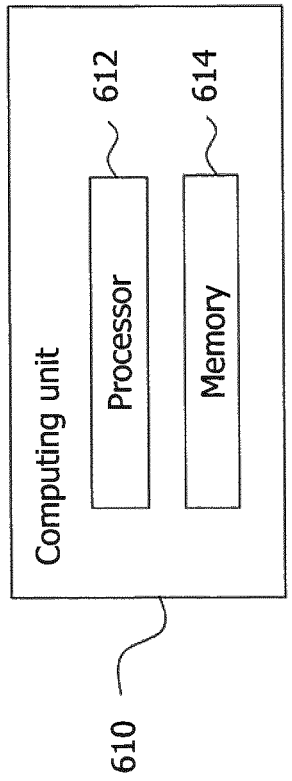
FIGS. 6a to 6c illustrate exemplary compositions of computing units according to the present disclosure.

FIG. 6a illustrates an exemplary composition of a computing unit 610 on which a VNF 402 may be executed. The computing unit 610 may comprise at least one processor 612 and at least one memory 614, wherein the at least one memory 614 contains instructions executable by the at least one processor 612 such that the computing unit 610 is operable to carry out the method steps described herein with reference to the first VNF 402.

Figure 6B:
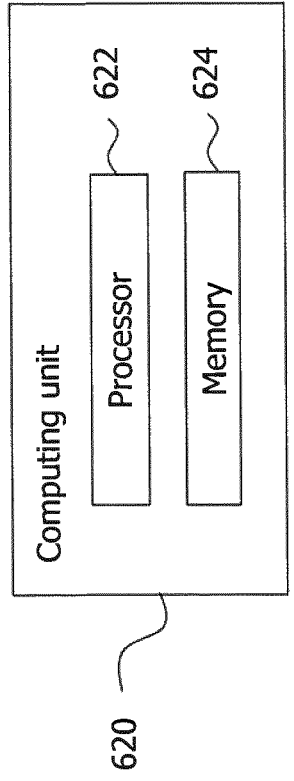

FIG. 6b illustrates an exemplary composition of a computing unit 620. The computing unit 620 may comprise at least one processor 622 and at least one memory 624, wherein the at least one memory 624 contains instructions executable by the at least one processor 622 such that the computing unit 620 is operable to carry out the method steps described herein with reference to a managing entity acting as an intermediary entity in the transmission of a link failure notification to the first VNF 402.

Figure 6C:
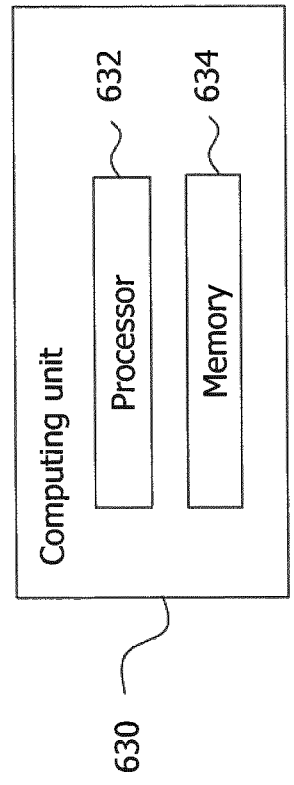

FIG. 6c illustrates an exemplary composition of a computing unit 630. The computing unit 630 may comprise at least one processor 632 and at least one memory 634, wherein the at least one memory 634 contains instructions executable by the at least one processor 632 such that the computing unit 630 is operable to carry out the method steps described herein with reference to a managing entity that triggers generation of a link failure notification.

It will be understood that, in a cloud architecture such as the cloud computing environment 400, the computing units 610, 620 and 630 may be physical computing units, but may be virtualized computing units as well, such as VMs, for example. It will further be understood that the computing units 610, 620 and 630 do not necessarily have to be standalone computing units, but may be implemented as components—realized in software and/or hardware—on a single or on multiple computing units (being either physical or virtual).

Figure 7A:
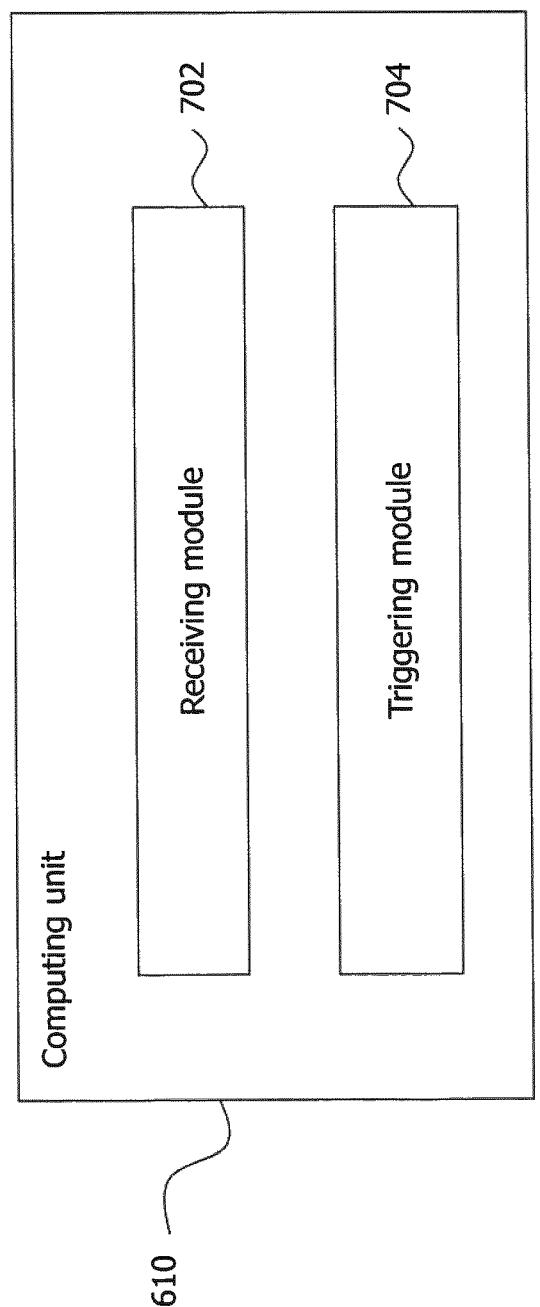
FIGS. 7a and 7b illustrate a modular composition of a computing unit on which the first VNF is executed and a corresponding method embodiment which may be performed by the first VNF.
Figure 7B:
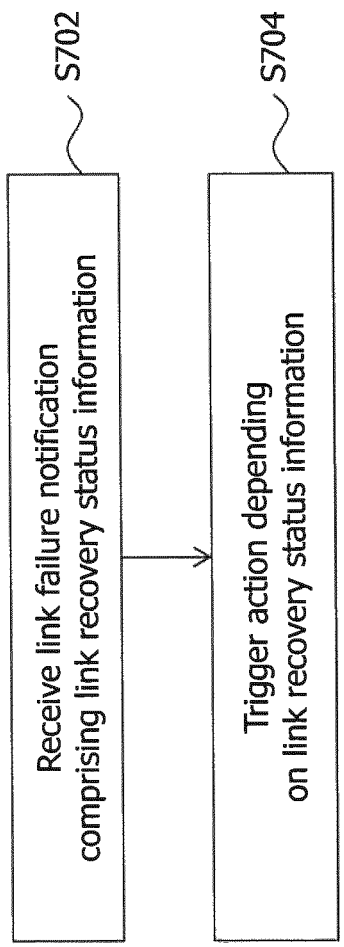

FIG. 7a schematically illustrates an exemplary modular composition of the computing unit 610 and FIG. 7b illustrates a corresponding method embodiment which may be performed by the computing unit 610 according to the present disclosure. The method may be performed by a first VNF 402 executed on the computing unit 610 and is dedicated to resolving a link failure occurring on a link between the first VNF 402 and a second VNF 402 provided in the cloud computing environment 400. The basic operation of the computing unit 610 will be described in the following with reference to both FIGS. 7a and 7b.

In step S702, a receiving module 702 of the computing unit 610 receives a link failure notification which comprises link recovery status information indicating a current recovery status of the link. The link recovery status information may enable the first VNF 402 to determine which action to be performed is most appropriate for resolving the link failure, e.g., which action resolves the link failure most quickly and/or with the least effort. The link recovery status information may indicate, for example, that recovery of the link is currently in progress, recovery of the link is already complete or recovery of the link is not possible at all. Recovery of the link may not be possible at all due to a software malfunction of the second VNF 402 which cannot be automatically resolved by the VIM 504 and which rather requires manual intervention, e.g., by service personnel. Recovery of the link may also not be possible when the link is down and an alternative network path from the first VNF 402 to the second VNF 402 cannot be established by the VIM 504. Recovery of the link may be indicated to be complete when the link was temporarily down and an alternative network path from the first VNF 402 to the second VNF 402 has already been established by the VIM 504. Recovery of the link may be indicated to be in progress when the link is currently down and a process for establishing an alternative network path from the first VNF 402 to the second VNF 402 has already been initiated by the VIM 504 but is not yet complete.

The link recovery status information may comprise an estimated recovery time (denoted herein below as $\Delta T_{ert}$) that indicates an estimated time within which recovery of the link can be expected. The estimated recovery time may be determined by the VIM 504 or the VNFM 502 based on past link failure recovery times encountered in the cloud computing environment 400. The link recovery status information may also comprise statistical information, such as a medium time to recovery, a variance, or the like.

The first VNF 402 may receive the link failure notification from the VNFM 502 via the interface VeNf-Vnfm 512. Prior to receiving the link failure notification, the first VNF 402 may have subscribed to receiving link failure notifications at the VNFM 502. Alternatively, it is conceivable that the first VNF 402 may receive the link failure notification from the VIM 504 directly. Although in FIG. 5 no direct interface between the VIM 504 and the VNFs 402 is illustrated, it will be understood that a corresponding interface may additionally be provided. In this case, the first VNF 402 may be subscribed to receiving failure notifications at the VIM 504.

In step S704, a triggering module 704 of the computing unit 610 triggers an action depending on the link recovery status information to resolve the link failure. If the link recovery status information indicates that recovery of the link is in progress, the action may comprise waiting for the link to be recovered if the estimated recovery time remains within a maximum allowed link failure time (i.e., $T_3$). On the other hand, if the estimated recovery time does not remain within the maximum allowed link failure time (i.e., $T_3$), the action may comprise triggering performing a failover substituting the second VNF 402 by the third VNF 402. If the link recovery status information indicates that recovery of the link is not possible, the action may comprise triggering performing a failover substituting the second VNF 402 by the third VNF 402. If the link recovery status information indicates that recovery of the link is already complete, the action may comprise discarding the link failure notification. In the latter case, no further action may be required to resolve the link failure.

The first VNF 402 may itself detect the link failure and, if the link failure is detected prior to receiving the link failure notification, a failover timer may be started that triggers performing a failover substituting the second VNF 402 by the third VNF 402 at a time that allows completing the failover within a maximum allowed link failure time (i.e., at $T_2$"). If, in this case, the link recovery status information indicates that recovery of the link is either in progress or complete, the action may comprise stopping the failover timer. In this case, the link failure may either be resolved already (recovery of the link complete) or performing the failover may be triggered based on the estimated recovery time (recovery of the link in progress) so that triggering performing the failover by the failover timer may no longer be required.

Figure 8A:
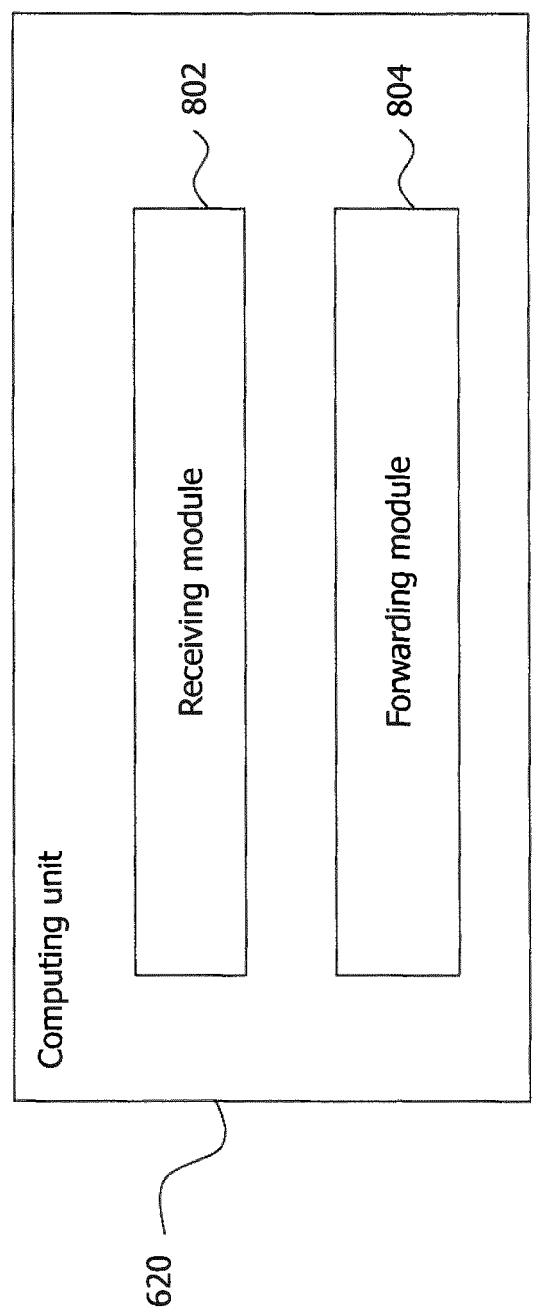
FIGS. 8a and 8b illustrate a modular composition of a computing unit on which a managing entity acting as an intermediary entity is executed and a corresponding method embodiment which may be performed by the managing entity.
Figure 8B:
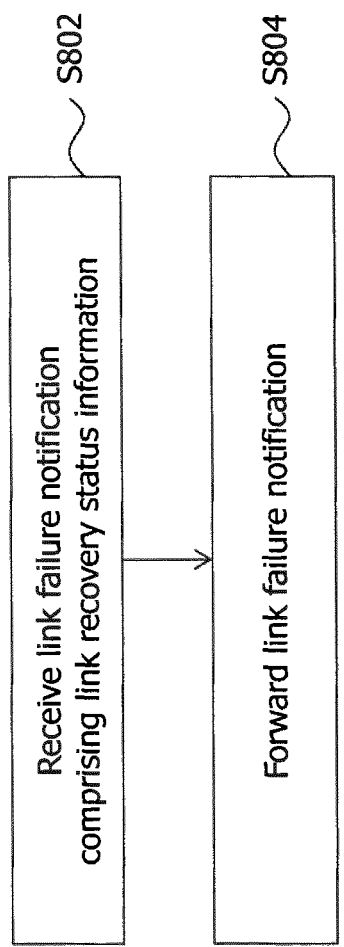

FIG. 8a schematically illustrates an exemplary modular composition of the computing unit 620 and FIG. 8b illustrates a corresponding method embodiment which may be performed by the computing unit 620 according to the present disclosure. The method may be performed by a managing entity executed on the computing unit 620 and is dedicated to support resolution of a link failure occurring on a link between the first VNF 402 and the second VNF 402. As explained above, the managing entity acts as an intermediary entity in the transmission of the link failure notification to the first VNF 402. The managing entity may be the VNFM 502 the VIM 504, or the NFVO 506, for example. The basic operation of the computing unit 620 will be described in the following with reference to both FIGS. 8a and 8b.

In step S802, a receiving module 802 of the computing unit 620 receives a link failure notification which comprises link recovery status information indicating a current recovery status of the link and, further, in step S804, a forwarding module 804 of the computing unit 620 forwards the link failure notification to a receiving entity provided in the cloud computing environment 400. If the managing entity is the VNFM 502, the receiving entity may be the first VNF 402, if the managing entity is the VIM 504, the receiving entity may be the VNFM 502 and, if the managing entity is the NFVO 506, the receiving entity may be the VNFM 502, for example. The link failure notification may be the same as the one referenced above in relation to FIGS. 7a and 7b.

Figure 9B:
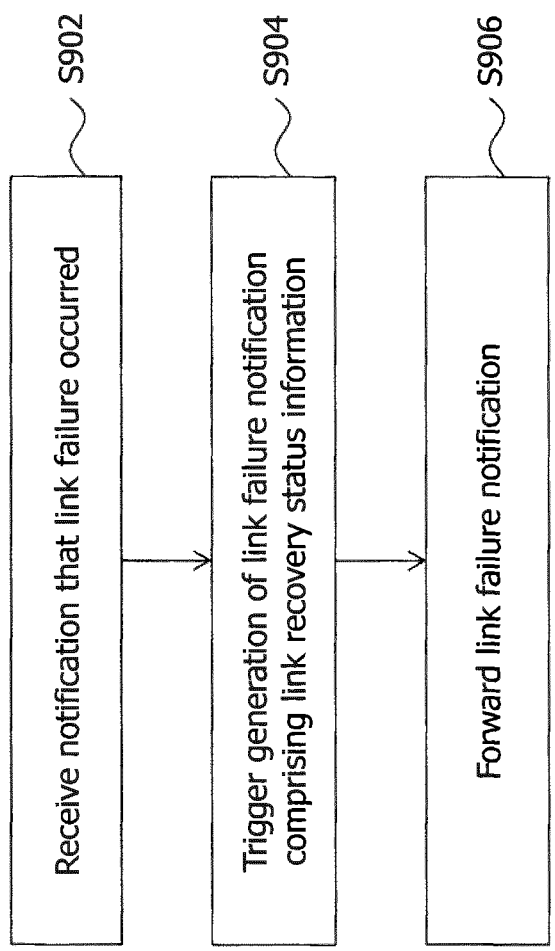

FIG. 9a schematically illustrates an exemplary modular composition of the computing unit 630 and FIG. 9b illustrates a corresponding method embodiment which may be performed by the computing unit 630 according to the present disclosure. The method may be performed by a managing entity executed on the computing unit 630 and is dedicated to support resolution of a link failure occurring on a link between the first VNF 402 and the second VNF 402. As explained above, the managing entity triggers generation of the link failure notification. The managing entity may be the VIM 504 or the VNFM 502, for example. The basic operation of the computing unit 630 will be described in the following with reference to both FIGS. 9a and 9b.

In step S902, a receiving module 902 of the computing unit 630 receives a notification that the link failure occurred. The notification may indicate the type of failure that occurred and, optionally, the component involved in establishing the link at which the failure occurred (e.g., vNIC, pNIC, virtual/physical switch, virtual/physical routers, etc.). If the managing entity is the VIM 504, the notification may be an event sent from a VM executed on the physical hardware resources of the NFVI 404, wherein the VM is the VM on which the first VNF 402 or the second VNF 402 is executed. If the managing entity is the VNFM 502, the notification may be an event sent from the first VNF 402 or the second VNF 402 to the VNFM 502.

In step S904, a triggering module 904 of the computing unit 630 triggers generation of a link failure notification which comprises link recovery status information indicating a current recovery status of the link. The link failure notification may be the same as the one referenced above in relation to FIGS. 7a and 7b as well as 8a and 8b. The link recovery status information may thus comprise an estimated recovery time ($\Delta T_{ert}$) that indicates an estimated time within which recovery of the link can be expected. The estimated recovery time may be determined based on past link failure recovery times encountered in the cloud computing environment 400. For example, the estimated recovery time may be calculated as an average of previously encountered recovery times (i.e., $\Delta T_r$) or may be defined as a maximum of previously encountered recovery times. In another example, the estimated recovery time may be calculated as a weighted average of previously encountered recovery times, wherein the weight may be a probability of occurrence of a particular link failure, e.g., the probability of occurrence of a link failure on a particular network connection point or segment. The previously encountered recovery times may comprise recovery times of all past link failures (i.e., independent of the link failure types) or may comprise recovery times of past link failures of one or more particular link failure types only. Link failure recovery times may be categorized according to link failure types for this purpose. Alternatively, the estimated recovery time may just be a predefined value. It will be understood that, in addition to the estimated recovery time, the link recovery status information may further comprise statistical information, such as a medium time to recovery, a variance, or the like.

In step S906, a forwarding module 906 of the computing unit 630 forwards the generated link failure notification to a receiving entity provided in the cloud computing environment 400. If the managing entity is the VIM 504, the receiving entity may be the VNFM 502 or the first VNF 402. If the managing entity is the VNFM 502, the receiving entity may be the first VNF 402.

Triggering generation of the link failure notification may be repeated upon each receipt of a notification on a change in the current recovery status of the link. Similar to the notification that the link failure occurred, this notification may be—if the managing entity is the VIM 504—an event sent from a VM executed on the physical hardware resources of the NFVI 404, wherein the VM is a VM on which the first or the second VNF 402 is executed. If the managing entity is the VNFM 502, the notification may be an event sent from the first VNF 402 and/or the second VNF 402 to the VNFM 502. Generation of the link failure notification may also be performed periodically, e.g., repeated in predetermined time intervals.

If the link between the first VNF 402 and the second VNF 402 is recoverable, the VIM 504 may allocate a new link (e.g., a different network path) between the first VNF 402 and the second VNF 402 to recover the link. In this case, the VIM may select the new link under the constraint to satisfy a link selection parameter that defines a maximum allowed link failure time. The link selection parameter may be defined, for example, by a user who instantiates the first VNF 402 and the second VNF 402 to make sure that link recovery remains within a guaranteed recovery time such that link failures between the first VNF 402 and the second VNF 402 are invisible to service users. The link selection parameter may be configurable at deployment time of the first VNF 402 and the second VNF 402, e.g., the link selection parameter may be defined in a virtual link descriptor (VLD) when a virtual link (VL) between the first VNF and the second VNF instances is defined in a Network Service Instantiation Flow.

The VIM 504 may send a notification to the VNFM 502 informing the VNFM 502 of the last possible time to start performing a failover from the second VNF 402 to a third (i.e., a backup) VNF 402 to remain within the maximum allowed link failure time. The notification may be sent close to reaching time $T_2''$ or at time $T_2''$, for example. The VNFM 502 may forward this notification to the first VNF 402 which, in turn, may consider it in determining the action to be triggered for resolving the link failure.

The following FIGS. 10 to 13 illustrate the operation of the technique presented herein for different possible points in time at which the link failure notification may be received at the first VNF 402 and summarize the corresponding actions that may be triggered by the first VNF 402 depending on the estimated recovery time $\Delta T_{ert}$ indicated in the received link failure notification.

For the further description, it is assumed that the link failure occurring on the link between the first VNF 402 and the second VNF 402 is detected by the NFVI 404 and that the NFVI 404 sends a notification that the link failure occurred to the VIM 504. The VIM 504 then triggers generation of the link failure notification including the estimated recovery time $\Delta T_{ert}$ and forwards the generated link failure notification to the VNFM 502. The VNFM 502, in turn, forwards the link failure notification to the first VNF 402.

In FIGS. 10 to 13, the first VNF 402 is denoted as VNF-A, the second VNF 402 is denoted as VNF-X and the third (i.e., backup) VNF 402 is denoted as VNF-Y. The value $\Delta T_{ert} = \infty$ means that the VIM 504 has found that automatic recovery of the link is not possible. $T_{lf}''''$ denotes the time at which the link failure notification is received at the first VNF 402.

Figure 10:
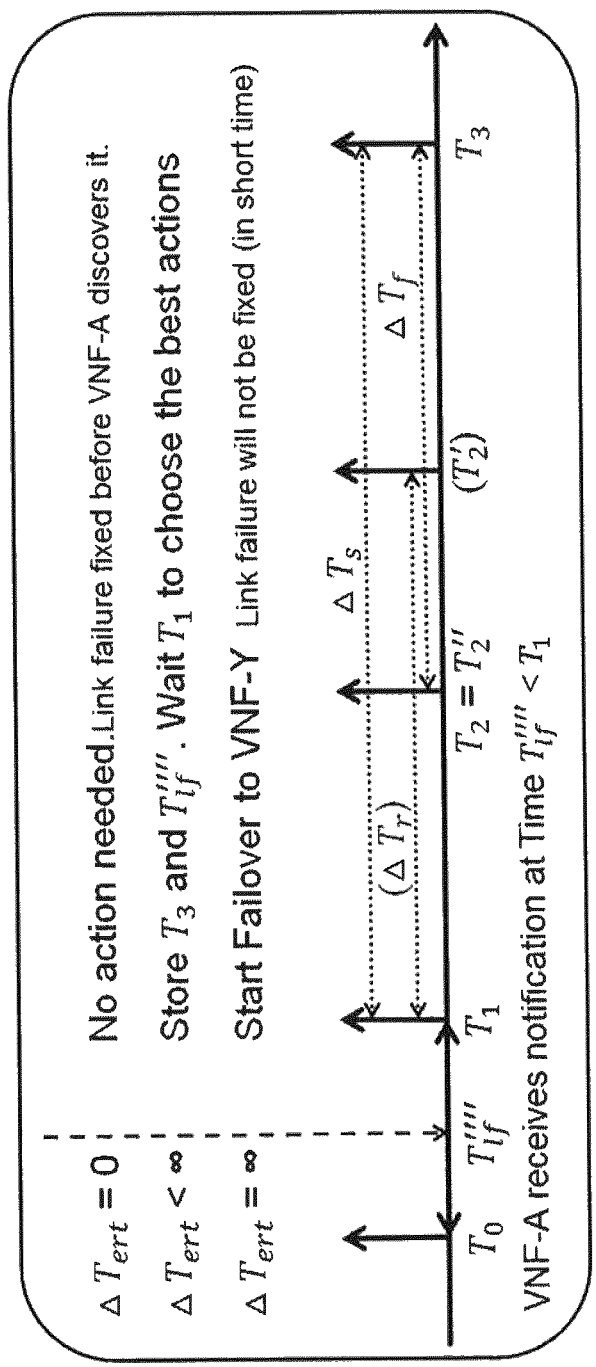
FIG. 10 illustrates the operation of the technique presented herein in a timeline for the case $T_{if}''''<T_1$.

FIG. 10 illustrates the operation of the technique presented herein in a timeline for the case $T_{lf}''''<T_1$. As indicated here, no action is needed if $\Delta T_{ert} = 0$ since the link failure is recovered before VNF-A recognizes it. If $\Delta T_{ert} = \infty$, it is clear that the link failure will not be fixed and, thus, a failover to VNF-Y may be started immediately (or e.g. at $T_1$), i.e., there is no need to wait until $T_2$ to start the failover. In all other cases, i.e., if $\Delta T_{ert}<\infty$, $T_{lf}''''$ may be stored and the most appropriate action may be determined at time $T_1$.

Figure 11:
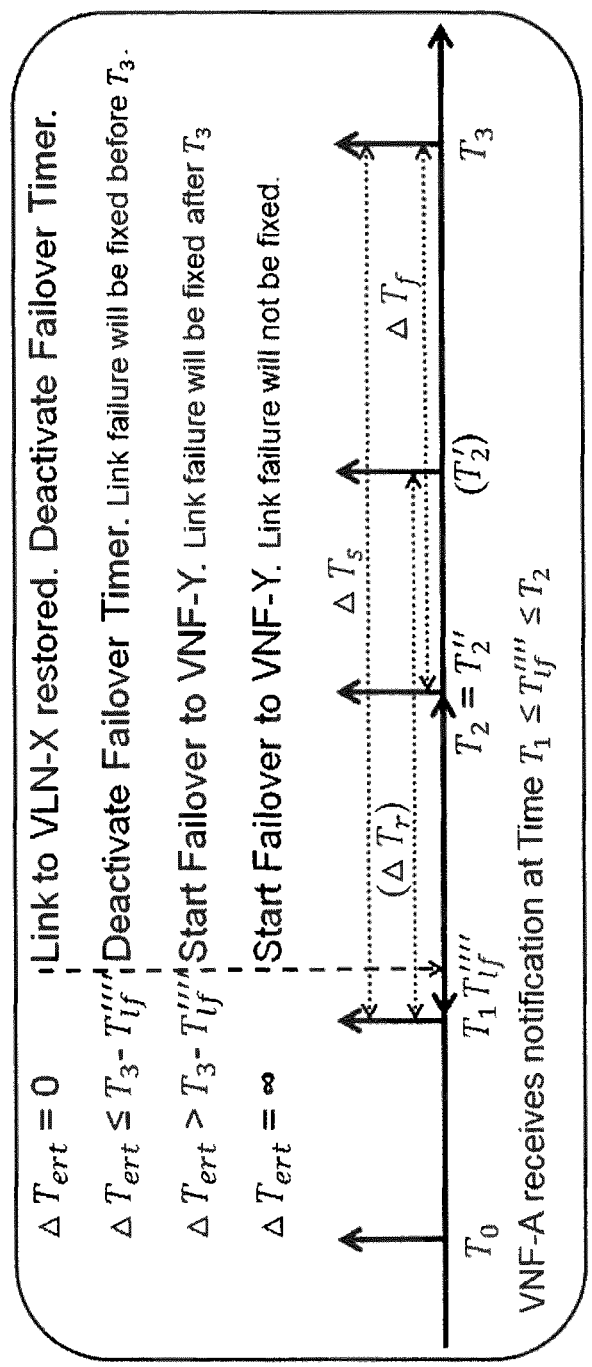
FIG. 11 illustrates the operation of the technique presented herein in a timeline for the case $T_1 \leq T_{if}'''' \leq T_2$.

FIG. 11 illustrates the operation of the technique presented herein in a timeline for the case $T_1 \leq T_{lf}'''' \leq T_2$. As indicated here, if $\Delta T_{ert} = 0$, the link failure is already recovered and, thus, VNF-A may try to reconnect to VNF-X. If a failover timer has already been started, the timer may be deactivated. If $\Delta T_{ert} = \infty$, it is clear that the link failure will not be fixed and, thus, a failover to VNF-Y may be started immediately. If $T_3 < T_{lf}'''' + \Delta T_{ert}$, a failover to VNF-Y may be started immediately as well. If, on the other hand, $T_3 \geq T_{lf}'''' + \Delta T_{ert}$, an already started failover timer may be deactivated and it may be waited until the link failure is recovered since the link failure will be fixed before $T_3$.

Figure 12:
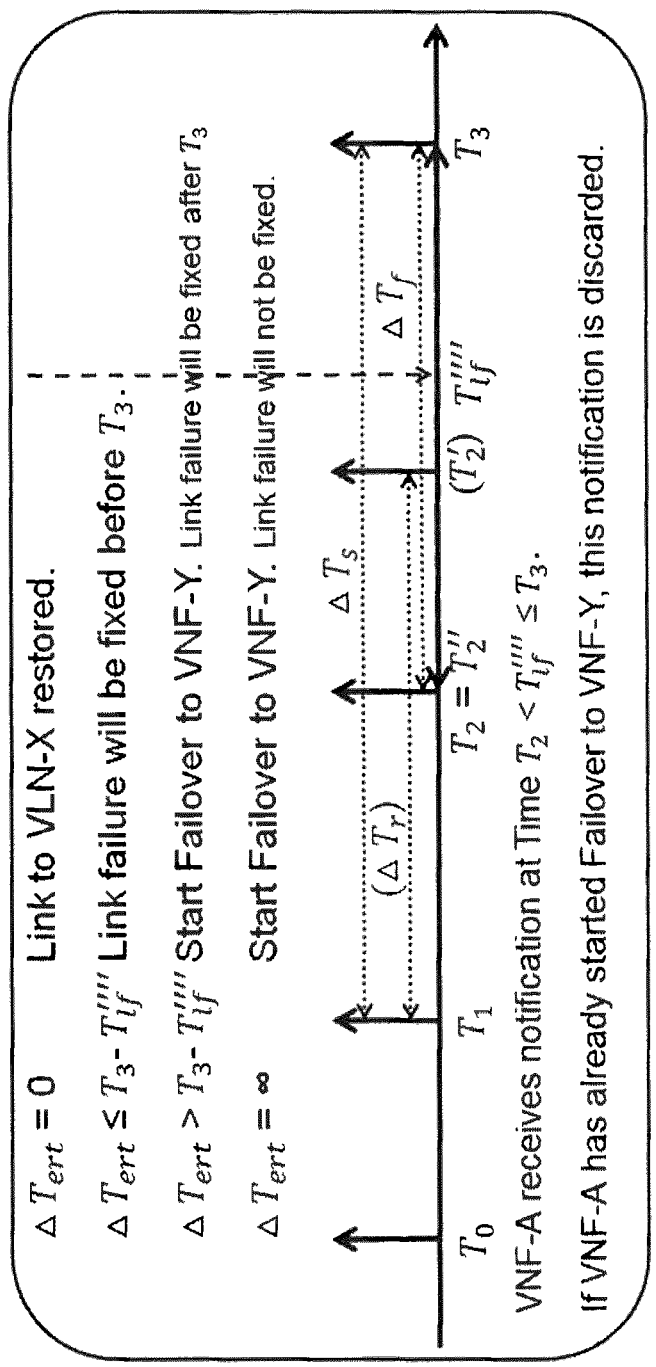
FIG. 12 illustrates the operation of the technique presented herein in a timeline for the case $T_2 \leq T_{if}'''' \leq T_3$.

FIG. 12 illustrates the operation of the technique presented herein in a timeline for the case $T_2 \leq T_{lf}'''' \leq T_3$. As indicated here, if $\Delta T_{ert} = 0$, the link failure is already recovered and, thus, VNF-A may try to reconnect to VNF-X. If a failover timer has already been started, the timer may be deactivated. If $\Delta T_{ert} = \infty$, it is clear that the link failure will not be fixed and, thus, a failover to VNF-Y may be started immediately. If $T_3 \geq T_{lf}'''' + \Delta T_{ert}$, an already started failover timer may be deactivated and it may be waited until the link failure is recovered since the link failure will be fixed before $T_3$. If, on the other hand, $T_3 < T_{lf}'''' + \Delta T_{ert}$, it may be waited until the link failure is recovered and an ongoing failover timer may be deactivated if $\Delta T_{ert} \geq \Delta T_f$. If $\Delta T_{ert} > \Delta T_f$, a failover to VNF-Y may be started immediately. If a failover has already been started, the link failure notification may simply be discarded.

Figure 13:
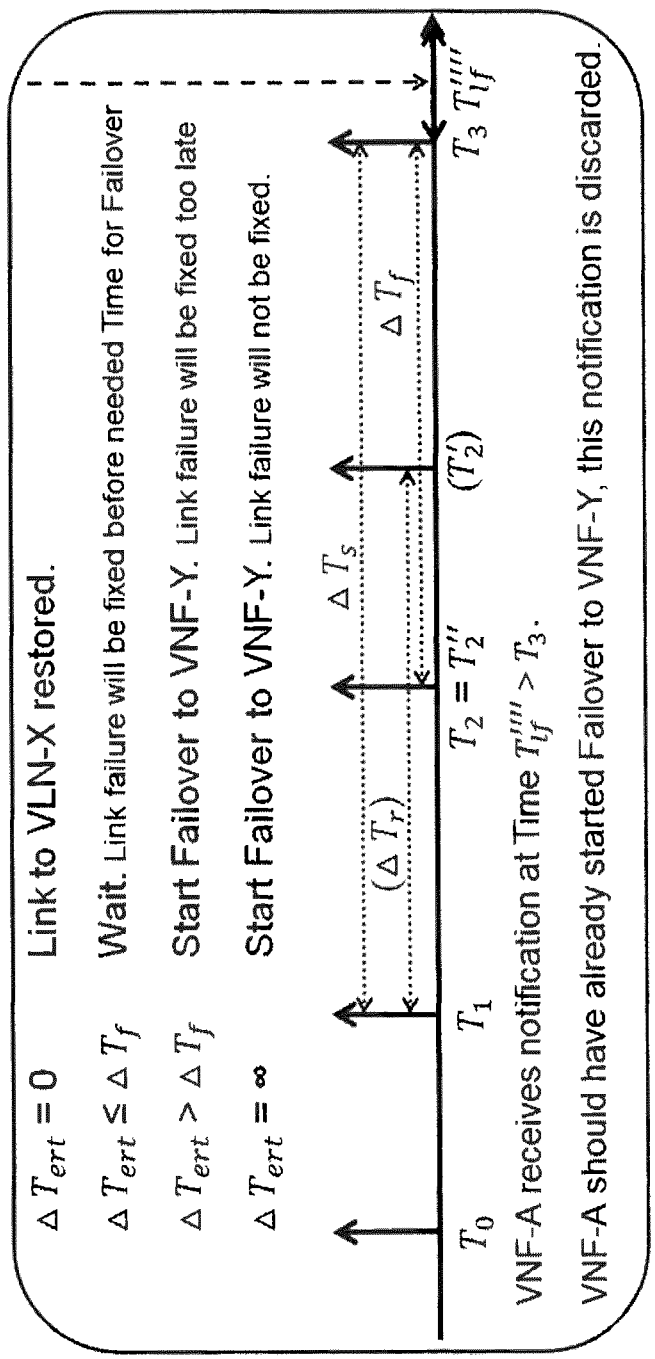
FIG. 13 illustrates the operation of the technique presented herein in a timeline for the case $T_{if}''''>T_3$.

FIG. 13 illustrates the operation of the technique presented herein in a timeline for the case $T_{lf}''''>T_3$. As indicated here, if $\Delta T_{ert} = 0$, the link failure is already recovered and, thus, VNF-A may try to reconnect to VNF-X. If a failover timer has already been started, the timer may be deactivated. If $\Delta T_{ert} = \infty$, it is clear that the link failure will not be fixed and, thus, a failover to VNF-Y may be started immediately. If $\Delta T_{ert} \leq \Delta T_f$, it may be waited until the link failure is recovered and an ongoing failover timer may be deactivated. If $\Delta T_{ert} > \Delta T_f$, a failover to VNF-Y may be started immediately. If a failover has already been started, the link failure notification may simply be discarded.

The following FIGS. 14 to 21 illustrate examples of the operation of the technique presented herein in sequence diagrams that highlight the interaction between the different entities of the NFV architectural framework involved. As in FIGS. 10 to 13, the first VNF 402 is denoted as VNF-A, the second VNF 402 is denoted as VNF-X and the third (i.e., backup) VNF 402 is denoted as VNF-Y. The value $\Delta T_{ert} = \infty$ means that the VIM 504 has found that automatic recovery of the link is not possible. The stimulus indicated in the FIGS. 14 to 21 may correspond to a heartbeat message, for example.

The following further abbreviations apply:
$T_{lf}$ denotes the time at which the NFVI 404 detects the link failure.
$T_{lf'}$ denotes the time at which the notification that the link failure occurred is received at the VIM 504.
$T_{lf}'''$ denotes the time at which the link failure notification is received at the VNFM 502.
$T_{lf}''''$ denotes the time at which the link failure notification is received at the first VNF 402.

Figure 14:
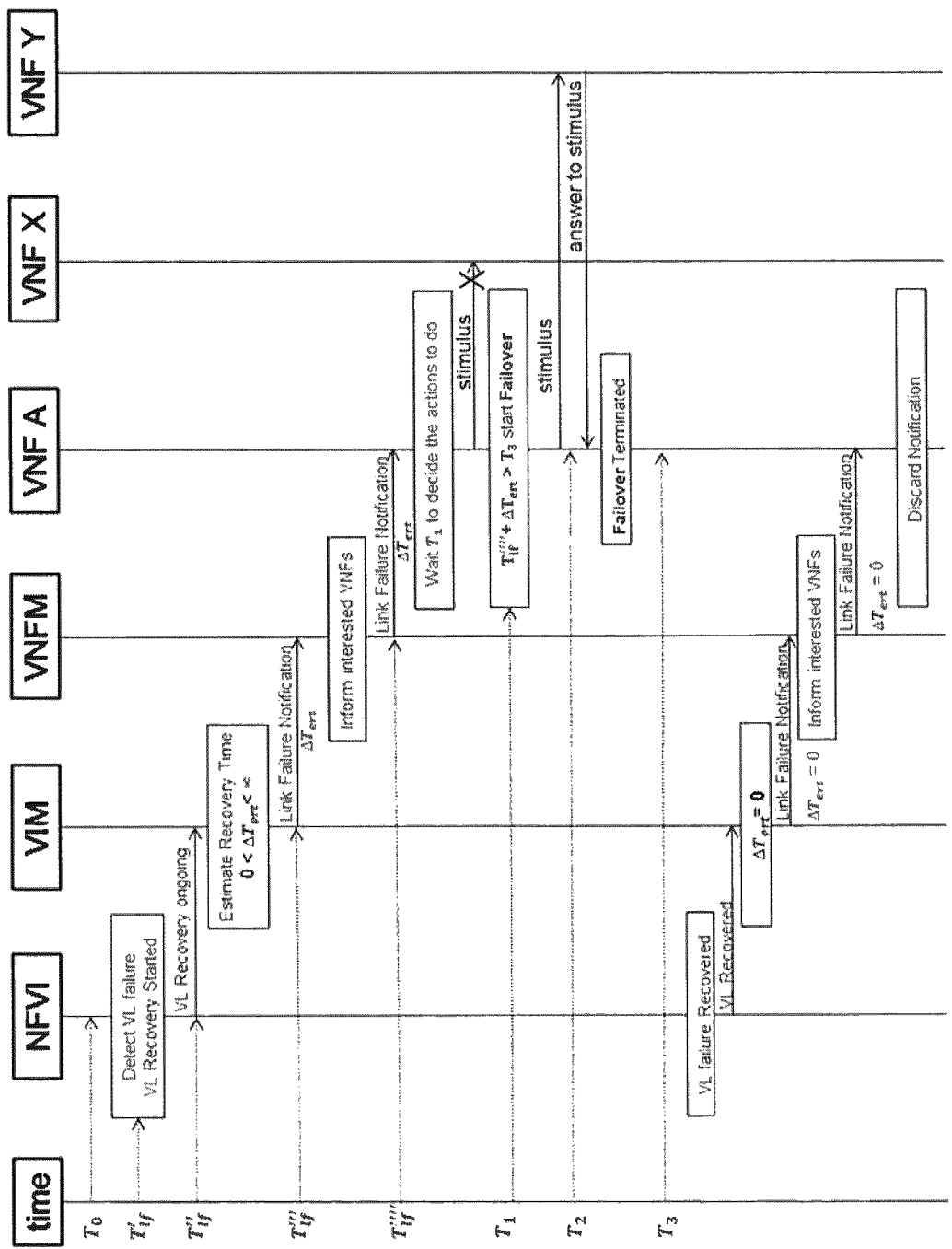
FIG. 14 illustrates the operation of the technique presented herein in a sequence diagram for the case $T_{if}''''<T_1$ and $T_{if}''''+\Delta T_{ert}>T_3$.

FIG. 14 illustrates the operation of the technique presented herein in an example for the case $T_{lf}''''<T_1$ and $T_{lf}'''' + \Delta T_{ert} > T_3$. In this example, VNF-A determines that recovery is not possible before $T_3$ since the value of $\Delta T_{ert}$ is too large and, thus, VNF-A starts a failover to VNF-Y at time $T_1$, i.e., without waiting until time $T_2$. When VNF-A later, i.e., after $T_3$, when the link failure has already been resolved by the failover, receives another notification indicating $\Delta T_{ert} = 0$, this notification is discarded.

Figure 15:
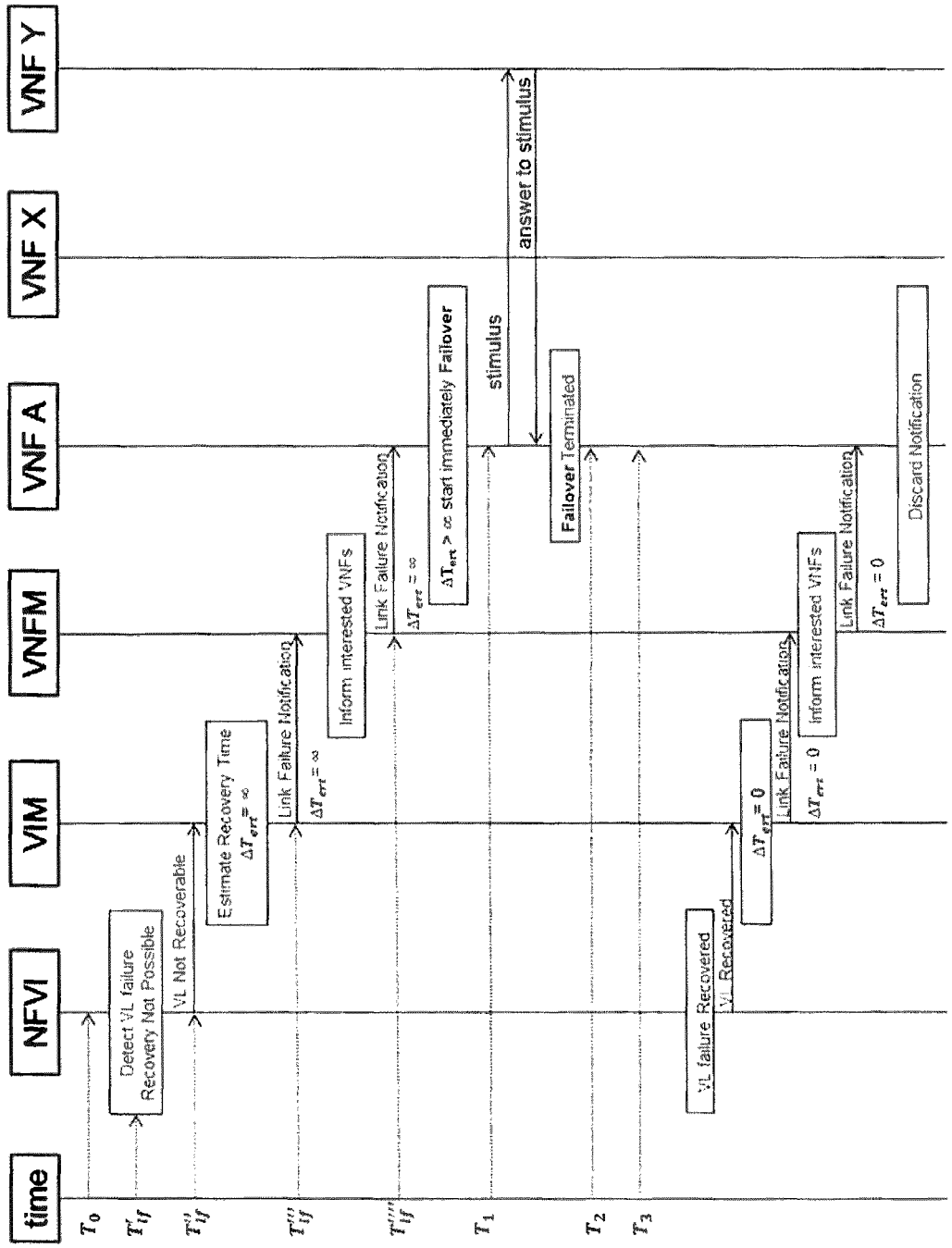
FIG. 15 illustrates the operation of the technique presented herein in a sequence diagram for the case $T_{if}''''<T_1$ and $\Delta T_{ert}=\infty$.

FIG. 15 illustrates the operation of the technique presented herein in an example for the case $T_{lf}''''<T_1$ and $\Delta T_{ert} = \infty$. In this example, VNF-A determines that recovery is not possible at all and, thus, VNF-A starts a failover to VNF-Y immediately, i.e., without waiting until time $T_2$. When VNF-A later, i.e., after $T_3$, when the link failure has already been resolved by the failover, receives another notification indicating $\Delta T_{ert} = 0$, this notification is discarded.

Figure 16:
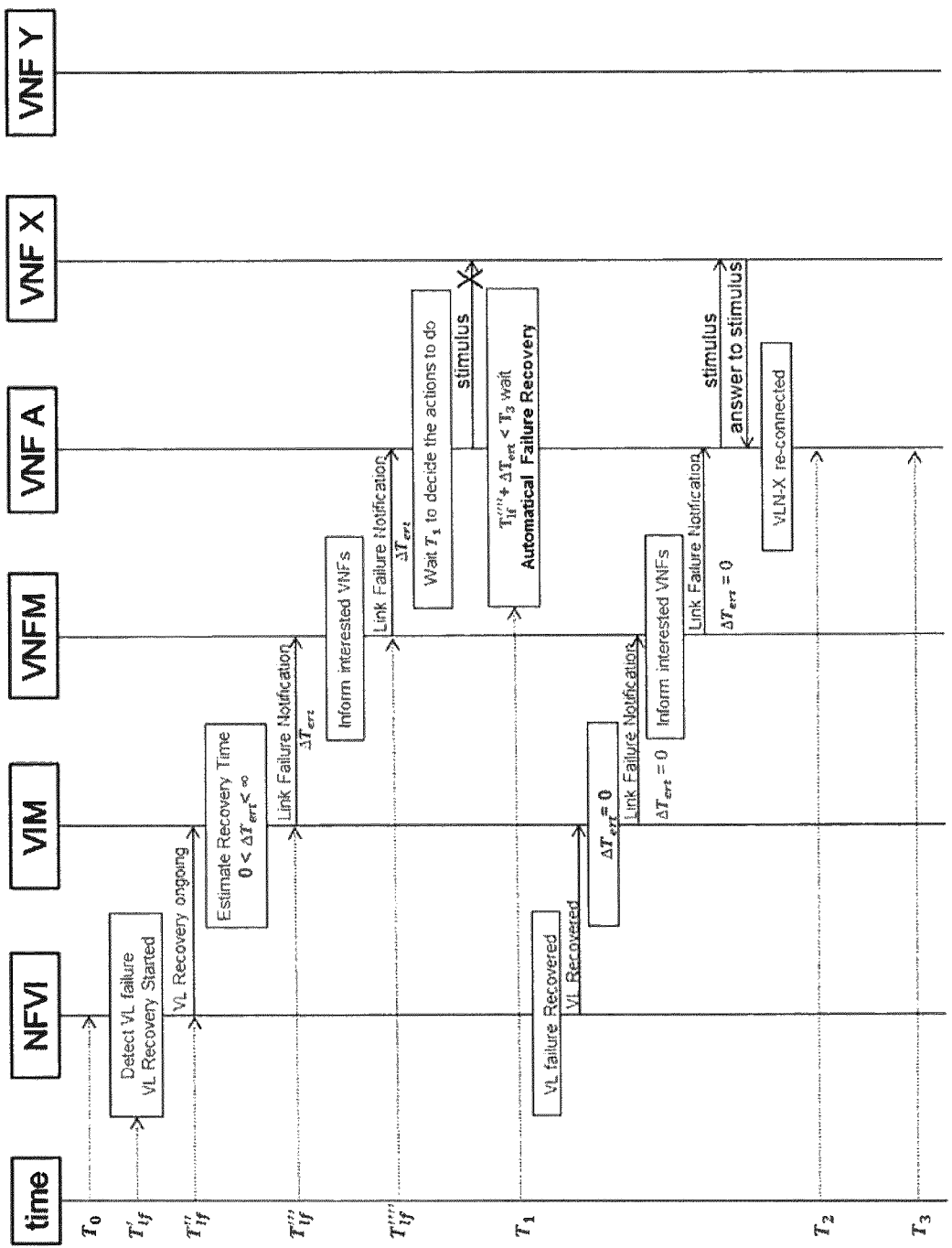
FIG. 16 illustrates the operation of the technique presented herein in a sequence diagram for the case $T_{if}''''<T_1$ and $T_{if}''''+\Delta T_{ert}<T_3$.

FIG. 16 illustrates the operation of the technique presented herein in an example for the case $T_{lf}''''<T_1$ and $T_{lf}'''' + \Delta T_{ert} < T_3$. In this example, VNF-A determines that recovery is possible before $T_3$ since the value of $\Delta T_{ert}$ is small enough and, thus, VNF-A waits until it receives another notification indicating $\Delta T_{ert} = 0$. Once this notification is received, VNF-A reconnects to VNF-X.

Figure 17:
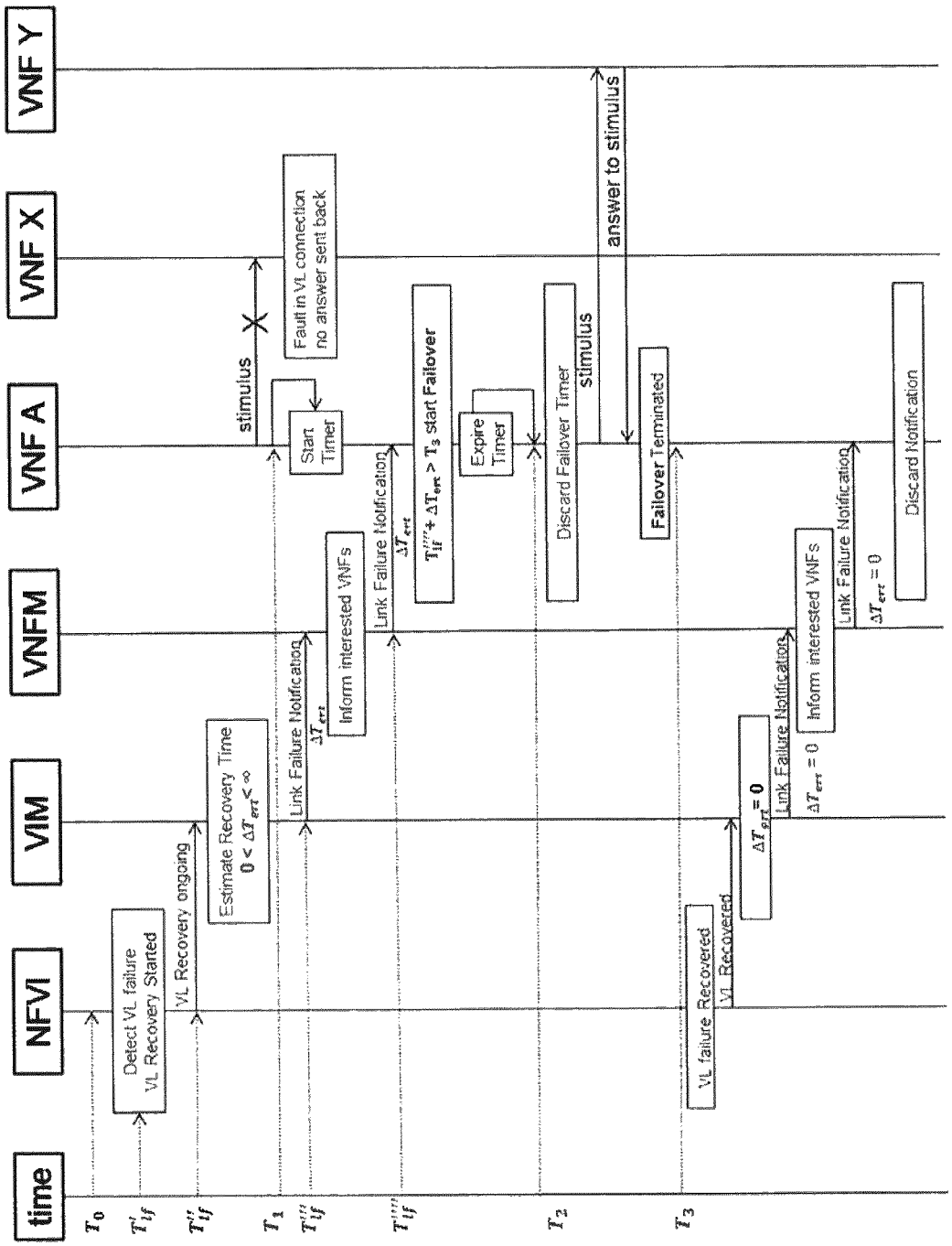
FIG. 17 illustrates the operation of the technique presented herein in a sequence diagram for the case $T_1 \leq T_{if}'''' \leq T_2$ and $T_{if}''''+\Delta T_{ert}>T_3$.

FIG. 17 illustrates the operation of the technique presented herein in an example for the case $T_1 \leq T_{lf}'''' \leq T_2$ and $T_{lf}'''' + \Delta T_{ert} > T_3$. In this example, VNF-A determines that recovery is not possible before $T_3$ since the value of $\Delta T_{ert}$ is too large and, thus, VNF-A starts a failover to VNF-Y immediately, i.e., without waiting until time $T_2$. Also, since VNF-A has already started a failover timer at time $T_1$, the failover timer is discarded since a failover is already in progress. When VNF-A later, i.e., after $T_3$, when the link failure has already been resolved by the failover, receives another notification indicating $\Delta T_{ert}=0$, this notification is discarded.

Figure 18:
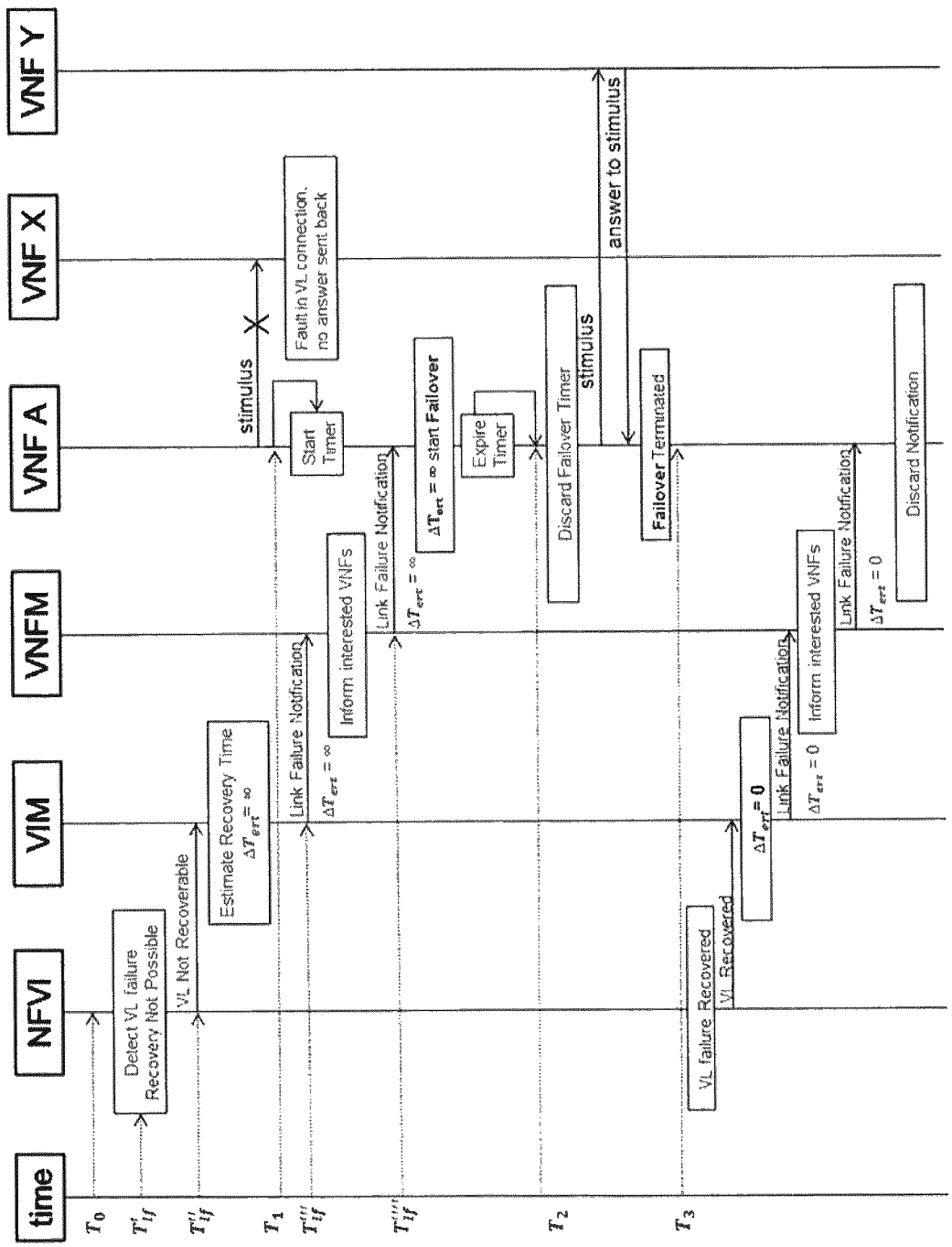
FIG. 18 illustrates the operation of the technique presented herein in a sequence diagram for the case $T_1 \leq T_{if}'''' \leq T_2$ and $\Delta T_{ert}=\infty$)

FIG. 18 illustrates the operation of the technique presented herein in an example for the case $T_1 \leq T_{if}'''' \leq T_2$ and $\Delta T_{ert}=\infty$. In this example, VNF-A determines that recovery is not possible at all and, thus, VNF-A starts a failover to VNF-Y immediately, i.e., without waiting until time $T_2$. Also, since VNF-A has already started a failover timer at time $T_1$, the failover timer is discarded since a failover is already in progress. When VNF-A later, i.e., after $T_3$, when the link failure has already been resolved by the failover, receives another notification indicating $\Delta T_{ert}=0$, this notification is discarded.

Figure 19:
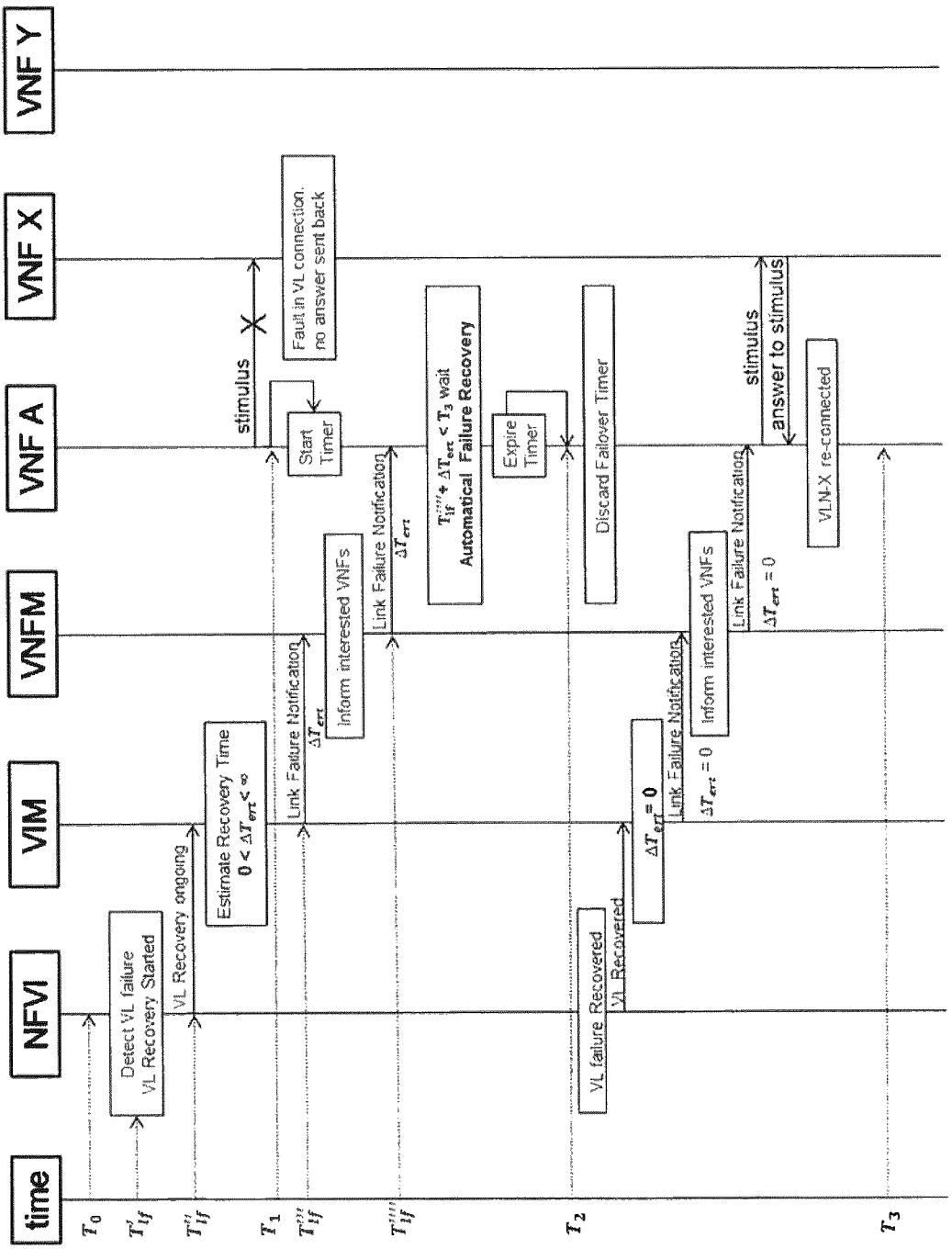
FIG. 19 illustrates the operation of the technique presented herein in a sequence diagram for the case $T_1 \leq T_{if}'''' \leq T_2$ and $T_{if}''''+\Delta T_{ert}<T_3$.

FIG. 19 illustrates the operation of the technique presented herein in an example for the case $T_1 \leq T_{if}'''' \leq T_2$ and $T_{if}''''+\Delta T_{ert}<T_3$. In this example, VNF-A determines that recovery is possible before $T_3$ since the value of $\Delta T_{ert}$ is small enough and, thus, VNF-A waits until it receives another notification indicating $\Delta T_{ert}=0$. Once this notification is received, VNF-A reconnects to VNF-X. Also, since VNF-A has already started a failover timer at time $T_1$, the failover timer is discarded since recovery is possible.

Figure 20:
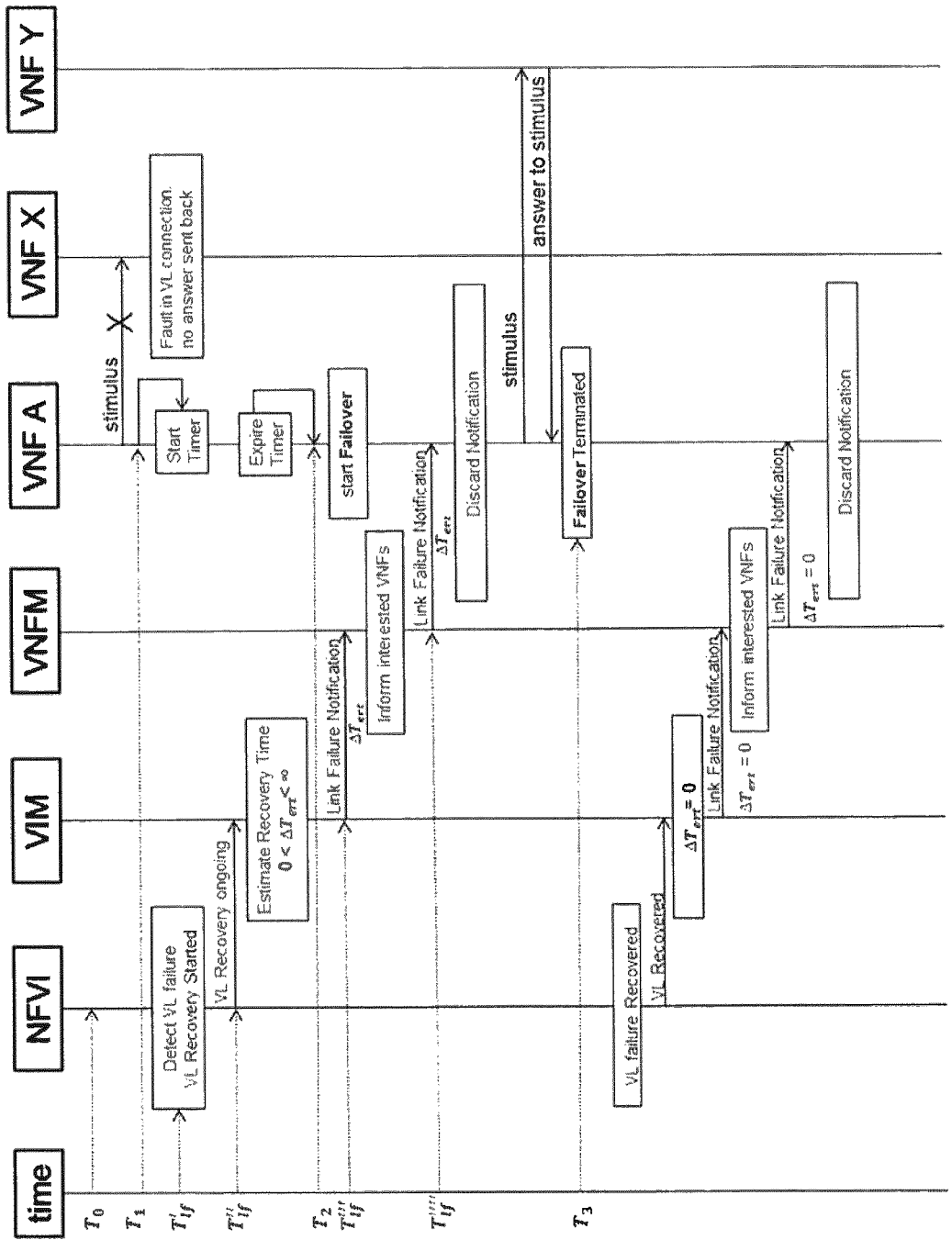
FIG. 20 illustrates the operation of the technique presented herein in a sequence diagram for the case $T_2 \leq T_{if}'''' \leq T_3$.

FIG. 20 illustrates the operation of the technique presented herein in an example for the case $T_2 \leq T_{if}'''' \leq T_3$. In this example, the link failure notification is received when a failover to VNF-Y has already been started. The notification is thus simply discarded. When VNF-A later, i.e., when the link failure has already been resolved by the failover, receives another notification indicating $\Delta T_{ert}=0$, this notification is discarded as well.

Figure 21:
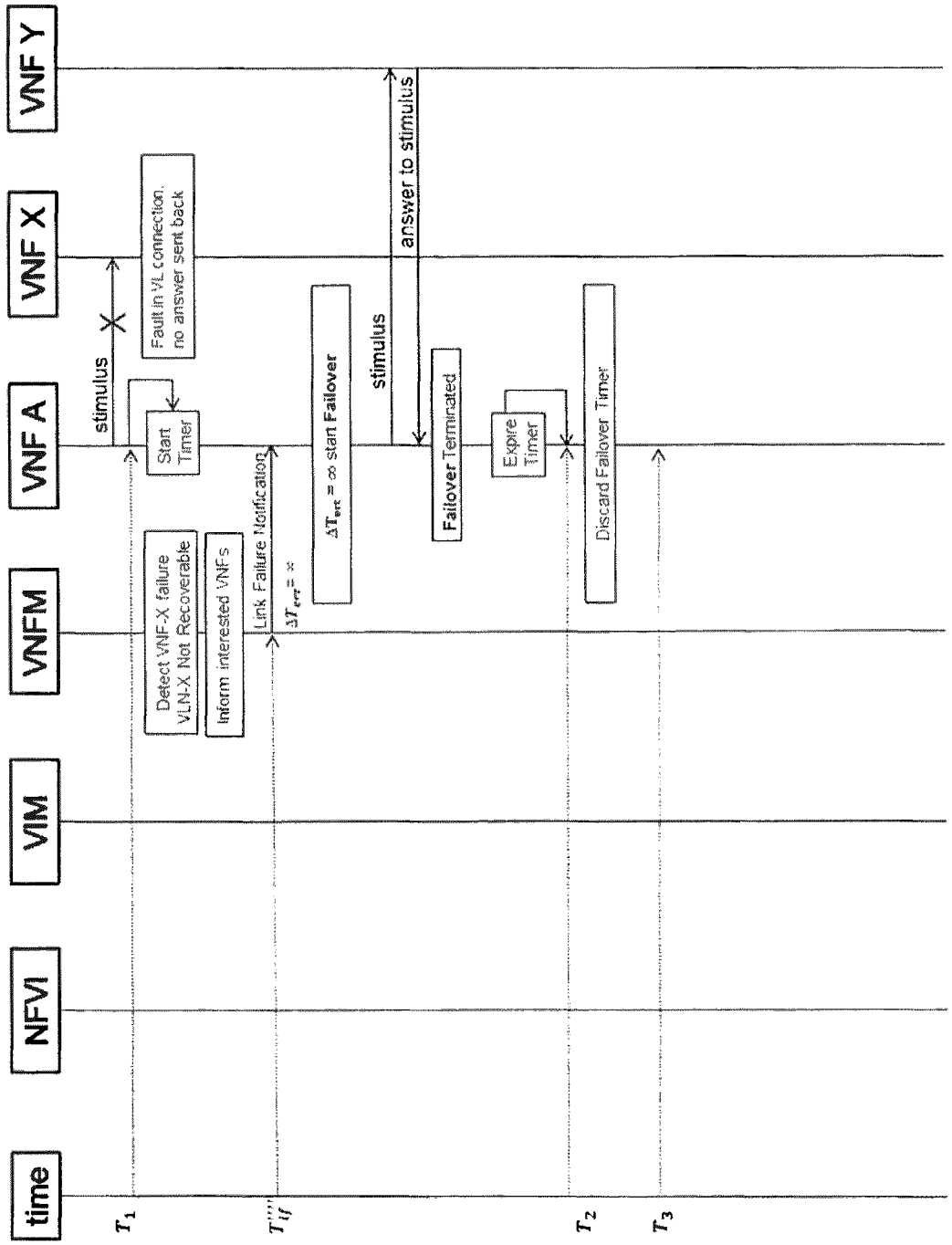
FIG. 21 illustrates the operation of the technique presented herein in a sequence diagram for the case that the link failure notification is generated by a VNFM.

FIG. 21 illustrates the operation of the technique presented herein in an example for the case that the link failure notification is generated by the VNFM 502. In this example, the link failure is detected by the VNFM 502 and it is further determined that the link failure is not recoverable. The VNFM 502 sends a link failure notification indicating $\Delta T_{ert}=\infty$ to VNF-A accordingly. VNF-A thus determines that recovery is not possible at all and starts a failover to VNF-Y immediately, i.e., without waiting until time $T_2$. Also, since VNF-A has already started a failover timer at time $T_1$, the failover timer is discarded since a failover is already in progress.

As has become apparent from the above embodiments, the present disclosure provides a technique for resolving a link failure occurring on a link between a first VNF and a second VNF. The presented technique may guarantee that network functions work correctly even if the characteristics of the underlying network infrastructure are unknown. The first VNF may automatically adapt to the underlying network infrastructure and manual tuning of failover timers—as in existing failover mechanisms—is no longer needed.

Improved in-service performance may be achieved since the first VNF may avoid unnecessary failovers and implement an optimal strategy being informed of the recovery actions undertaken by the system. The first VNF may be enabled to determine whether it is more appropriate to wait for the link to be recovered or to perform a failover substituting the second VNF by a third (i.e., backup) VNF instantly. Unnecessary failovers may thus be avoided and, if a failover is indeed needed, it may be started as soon as possible (i.e., without waiting for a failover timer expiry), thereby reducing the time required for resolving the link failure. By reducing the number of failovers in the network, it may also be easier to identify the root cause of a failure in the network link.

It may also be considered that a failover from the second VNF to the third VNF has a cost because sometimes certain operations cannot be completed and must be restarted, e.g., transactional updates of data, batch processes, or the like. Thus, by the fact that the first VNF may decide to wait for the link to be up again if this is done within a certain time, a trade-off may be made between considering the total cost of performing the failover and later reverting back and waiting some known time for the link to be fixed.

It is believed that the advantages of the technique presented herein will be fully understood from the foregoing description, and it will be apparent that various changes may be made in the form, constructions and arrangement of the exemplary aspects thereof without departing from the scope of the invention or without sacrificing all of its advantageous effects. Because the technique presented herein can be varied in many ways, it will be recognized that the invention should be limited only by the scope of the claims that follow.

The invention claimed is:

1. A method for resolving a link failure occurring on a link between a first virtualized network function (VNF) and a second VNF provided in a cloud computing environment, the method being performed by the first VNF and comprising:
   detecting the link failure prior to receiving a link failure notification;
   responsive to detecting the link failure prior to receiving the link failure notification, starting a failover timer that triggers performing a failover substituting the second VNF by a third VNF at a time that allows completing the failover within a maximum allowed link failure time;
   receiving, from a VNF manager (VNFM) of the cloud computing environment that controls the first VNF, a link failure notification comprising link recovery status information indicating a current recovery status of the link, wherein the link recovery status information comprises an estimated recovery time, the estimated recovery time indicating an estimated time within which recovery of the link can be expected based on a type of the link failure between the first VNF and the second VNF; and
   triggering an action to substitute the second VNF by a third VNF to resolve the link failure based on the estimated time within which recovery of the link can be expected.

2. The method of claim 1, wherein, when the link recovery status information indicates that recovery of the link is in progress, the action to substitute the second VNF by a third VNF comprises:
   waiting for the link to be recovered based on a determination that the estimated recovery time remains within a maximum allowed link failure time, and
   triggering performing a failover substituting the second VNF by the third VNF based on a determination that the estimated recovery time does not remain within the maximum allowed link failure time.

3. The method of claim 1, wherein, when the link recovery status information indicates that recovery of the link is not possible, the action comprises triggering performing a failover substituting the second VNF by the third VNF.

4. The method of claim 1, wherein, when the link recovery status information indicates that recovery of the link is in progress or complete, the action comprises stopping the failover timer.

5. The method of claim 1, wherein the method further comprises, prior to receiving the link failure notification, subscribing to receiving link failure notifications.

6. A method for supporting resolution of a link failure occurring on a link between a first virtualized network function (VNF) and a second VNF provided in a cloud computing environment, the method being performed by a VNF manager (VNFM) that controls the first VNF provided in the cloud computing environment, the method comprising:
   receiving, from the first VNF and prior to receiving any link failure notifications for the link, a request to subscribe to link failure notifications;
   registering the first VNF to receive link failure notifications for the link based on the request;
   receiving, from a virtualized infrastructure manager (VIM) of the cloud computing environment that controls the VNFM, a link failure notification comprising link recovery status information indicating a current recovery status of the link, wherein the link recovery status information comprises an estimated recovery time, the estimated recovery time indicating an estimated time within which recovery of the link can be expected based on a type of the link failure between the first VNF and the second VNF; and
   forwarding the link failure notification comprising the estimated time within which recovery of the link can be expected to the first VNF provided in the cloud computing environment based on the first VNF being subscribed to receive the link failure notification.

7. A method for supporting resolution of a link failure occurring on a link between a first virtualized network function (VNF) and a second VNF provided in a cloud computing environment, the method being performed by a virtualized infrastructure manager (VIM) provided in the cloud computing environment and comprising:
   receiving, from a network functions virtualization infrastructure (NFVI) in which at least one of the first VNF and the second VNF are deployed, a notification that the link failure occurred, wherein the VIM controls the NFVI;
   triggering generation of a link failure notification comprising link recovery status information indicating a current recovery status in which the link failure occurred, wherein the link recovery status information comprises an estimated recovery time, the estimated recovery time indicating an estimated time within which recovery of the link can be expected based on a type of the link failure between the first VNF and the second VNF; and
   forwarding the link failure notification comprising the estimated time within which recovery of the link can be expected to a VNF manager (VNFM) provided in the cloud computing environment that controls the first VNF to trigger an action by the first VNF to resolve the link failure based on the estimated time within which recovery of the link can be expected.

8. The method of claim 7, wherein the estimated recovery time is determined further based on past link failure recovery times for the type of the link failure between the first VNF and the second VNF.

9. The method of claim 8, wherein the past link failure recovery times are categorized according to link failure types, and wherein the past link failure recovery times comprise link failure recovery times of a particular link failure type only.

10. The method of claim 7, wherein triggering generation of the link failure notification and forwarding the link failure notification is repeated upon each receipt of a notification on a change in the current recovery status of the link.

11. The method of claim 7, wherein the VIM allocates a new link between the first VNF and the second VNF to recover the link.

12. The method of claim 11, wherein the VIM selects the new link under the constraint to satisfy a link selection parameter defining a maximum allowed link failure time.

13. The method of claim 12, wherein the link selection parameter is configurable at deployment time of the first VNF and the second VNF.

14. The method of claim 12, wherein the VIM sends a notification to the VNFM which controls the first VNF informing the VNFM of the last possible time to start performing a failover from the second VNF to a third VNF to remain within the maximum allowed link failure time.

15. A computing device for resolving a link failure occurring on a link between a first virtualized network function (VNF) and a second VNF provided in a cloud computing environment, wherein the first VNF is executed on the computing device, the computing device comprising:
   at least one processor; and
   at least one memory, the at least one memory containing instructions executable by the at least one processor such that the first VNF is operable to,
   detect the link failure prior to receiving a link failure notification,
   start a failover timer that triggers performing a failover substituting the second VNF by a third VNF at a time that allows completing the failover within a maximum allowed link failure time in response to the detection of the link failure prior to the reception of the link failure notification,
   receive, from a VNF manager (VNFM) of the cloud computing environment that controls the first VNF, a link failure notification comprising link recovery status information indicating a current recovery status of the link, wherein the link recovery status information comprises an estimated recovery time, the estimated recovery time indicating an estimated time within which recovery of the link can be expected based on a type of the link failure between the first VNF and the second VNF; and
   trigger an action to substitute the second VNF by a third VNF to resolve the link failure based on the estimated time within which recovery of the link can be expected.

16. A computing device for supporting resolution of a link failure occurring on a link between a first virtualized network function (VNF) and a second VNF provided in a cloud computing environment, wherein a VNF manager (VNFM) that controls the first VNF is executed on the computing device, the computing device comprising:
   at least one processor; and
   at least one memory, the at least one memory containing instructions executable by the at least one processor such that the managing entity is operable to,
   receive, from the first VNF and prior to receiving any link failure notifications for the link, a request to subscribe to link failure notifications;
   register the first VNF to receive link failure notifications for the link based on the request;
   receive, from a virtualized infrastructure manager (VIM) of the cloud computing environment that controls the VNFM, a link failure notification comprising link recovery status information indicating a current recovery status of the link, wherein the link recovery status information comprises an estimated recovery time, the estimated recovery time indicating an estimated time within which recovery of the link can be expected based on a type of the link failure between the first VNF and the second VNF; and forward the link failure notification comprising the estimated time within which recovery of the link can be expected to the first VNF provided in the cloud computing environment based on the first VNF being subscribed to receive the link failure notification.

17. A computing device for supporting resolution of a link failure occurring on a link between a first virtualized network function, VNF, and a second VNF provided in a cloud computing environment, wherein a virtualized infrastructure manager (VIM) is executed on the computing device, the computing device comprising:

at least one processor; and at least one memory, the at least one memory containing instructions executable by the at least one processor such that the managing entity is operable to:

receive, from a network functions virtualization infrastructure (NFVI) in which at least one of the first VNF and the second VNF are deployed, a notification that the link failure occurred, wherein the VIM controls the NFVI;

trigger generation of a link failure notification comprising link recovery status information indicating a current recovery status of the in which the link failure occurred, wherein the link recovery status information comprises an estimated recovery time, the estimated recovery time indicating an estimated time within which recovery of the link can be expected based on a type of the link failure between the first VNF and the second VNF; and forward the link failure notification comprising the estimated time within which recovery of the link can be expected to a VNF manager (VNFM) provided in the cloud computing environment that controls the first VNF to tripper an action by the first VNF to resolve the link failure based on the estimated time within which recovery of the link can be expected.

18. The method of claim 1, wherein the estimated recovery time is further based on a weighted average of previously encountered recovery times.

19. The method of claim 18, wherein the weight comprises a probability of an occurrence of a link failure associated with the type of link between the first VNF and the second VNF.

20. The method of claim 1, wherein the type of link between the first VNF and the second VNF is associated with a type of component involved in establishing the link between the first VNF and the second VNF.

21. The method of claim 20, wherein the type of component comprises one of a guest operating system (OS), a virtual network interface card (vNIC), and a physical network interface card (pNIC).

* * * * *